US006766513B2

(12) United States Patent
Charnell et al.

(10) Patent No.: US 6,766,513 B2
(45) Date of Patent: Jul. 20, 2004

(54) METHOD AND SYSTEM OF MEMORY MANAGEMENT USING STACK WALKING

(75) Inventors: William Thomas Charnell, Bucks (GB); Wayne Plummer, Bucks (GB); Stephen Darnell, Maidenhead (GB); Blaise Abel Alec Dias, Middx (GB); Philippa Joy Guthrie, Bucks (GB); Jeremy Paul Kramskoy, Long Kitton (GB); Jeremy James Sexton, Herts (GB); Michael John Wynn, Maidenhead (GB); Keith Rautenback, Bucks (GB); Stephen Paul Thomas, Bucks (GB)

(73) Assignee: Esmertec AG, Dubendorf (CH)

( * ) Notice: Subject to any disclaimer, the term of this patent is extended or adjusted under 35 U.S.C. 154(b) by 0 days.

(21) Appl. No.: 09/859,161

(22) Filed: May 16, 2001

(65) Prior Publication Data

US 2002/0029357 A1 Mar. 7, 2002

Related U.S. Application Data

(63) Continuation of application No. PCT/GB99/00788, filed on Mar. 16, 1999, now abandoned.

(30) Foreign Application Priority Data

Nov. 16, 1998 (GB) .............................................. 9825102

(51) Int. Cl.[7] .................................................. G06F 9/45
(52) U.S. Cl. ....................... 717/154; 717/139; 717/140; 717/141; 711/6; 709/150
(58) Field of Search ................................ 717/140, 145, 717/143, 150, 151, 154, 139–141, 148, 153; 711/6; 709/106; 712/220

(56) References Cited

U.S. PATENT DOCUMENTS

| 4,675,829 A | 6/1987 | Clemenson |
| 4,924,408 A | 5/1990 | Highland |

(List continued on next page.)

OTHER PUBLICATIONS

TITLE: Safety consideration for storage allocation optimizations, Author : D. R. Chase, ACM, 1988.*
TITLE: Memory Management with Explicit Regions, author: Gay et al, ACM, 1998.*
TITLE: Systematically derived instruction sets for high–level language support, author: Bose et al, ACM, 1982.*
Java World—Di Giorgio—Jul. 1997– Use native methods to expand the Java environment.
Karaorman, M. et al. —jContractor: a reflective Java library to support design by contract –V1616, Jul. 19–21, 1999, pp. 175–196, Saint–Malo, Fr.

(List continued on next page.)

Primary Examiner—Chameli Chandhuri Das
(74) Attorney, Agent, or Firm—Caesar, Rivise, Bernstein, Cohen & Pokotilow, Ltd.

(57) ABSTRACT

A method and a system of memory management using stack walking. The method of managing memory in a computer system includes identifying compiled code to be deleted, examining the return addresses of the frames in the stack, determining whether any of the return address of the frames are in the range of addresses of the compiled code to be deleted, and if they are, then altering the contents of the frame determined to have a return address in the range of addresses of the compiled code to be deleted.

17 Claims, 38 Drawing Sheets

U.S. PATENT DOCUMENTS

| | | | |
|---|---|---|---|
| 5,210,876 A | 5/1993 | Uchida | |
| 5,301,260 A | 4/1994 | Miyashita | |
| 5,301,325 A | 4/1994 | Benson | |
| 5,339,436 A | 8/1994 | Tairaku et al. | |
| 5,367,685 A | 11/1994 | Gosling | |
| 5,442,792 A | 8/1995 | Chun | |
| 5,450,575 A | 9/1995 | Sites | |
| 5,452,457 A | 9/1995 | Alpert et al. | |
| 5,469,574 A | 11/1995 | Chang et al. | |
| 5,530,964 A | 6/1996 | Alpert et al. | |
| 5,535,329 A * | 7/1996 | Hastings | 714/35 |
| 5,551,040 A | 8/1996 | Blewett | |
| 5,560,003 A * | 9/1996 | Nilsen et al. | 707/206 |
| 5,590,332 A | 12/1996 | Baker | |
| 5,598,561 A | 1/1997 | Funaki | |
| 5,603,030 A | 2/1997 | Gray et al. | |
| 5,613,120 A | 3/1997 | Palay et al. | |
| 5,655,122 A | 8/1997 | Wu | |
| 5,675,804 A | 10/1997 | Sidik et al. | |
| 5,721,854 A | 2/1998 | Ebcioglu et al. | |
| 5,761,511 A * | 6/1998 | Gibbons et al. | 717/122 |
| 5,761,513 A | 6/1998 | Yellin et al. | |
| 5,764,989 A | 6/1998 | Gustafsson et al. | |
| 5,815,720 A | 9/1998 | Buzbee | |
| 5,835,771 A | 11/1998 | Veldhuizen | |
| 5,842,016 A * | 11/1998 | Toutonghi et al. | 709/106 |
| 5,848,274 A | 12/1998 | Hamby et al. | |
| 5,857,104 A | 1/1999 | Natarjan et al. | |
| 5,872,978 A | 2/1999 | Hoskins | |
| 5,873,104 A | 2/1999 | Tremblay et al. | |
| 6,052,739 A * | 4/2000 | Bopardikar et al. | 709/321 |
| 6,094,664 A * | 7/2000 | Ungar | 707/206 |
| 6,192,517 B1 * | 2/2001 | Agesen et al. | 717/154 |
| 6,199,075 B1 * | 3/2001 | Ungar et al. | 707/206 |
| 6,260,077 B1 * | 7/2001 | Rangarajan et al. | 719/328 |
| 6,317,872 B1 * | 11/2001 | Gee et al. | 717/152 |
| 6,330,659 B1 * | 12/2001 | Poff et al. | 712/34 |
| 6,349,406 B1 * | 2/2002 | Levine et al. | 717/128 |
| 6,381,735 B1 * | 4/2002 | Hunt | 717/158 |
| 6,381,738 B1 * | 4/2002 | Choi et al. | 717/124 |
| 6,397,379 B1 * | 5/2002 | Yates, Jr. et al. | 717/140 |
| 6,457,111 B1 * | 9/2002 | Howard et al. | 711/170 |
| 6,480,862 B1 * | 11/2002 | Gall | 707/103 |
| 6,625,635 B1 * | 9/2003 | Elnozahy | 718/102 |
| 6,671,795 B1 * | 12/2003 | Marr et al. | 712/220 |

OTHER PUBLICATIONS

Java Native Interface Specification—Java Native Interface Specification Release May 16, 1997, Sun Microsystems, Inc., California.

Dyadkin, L.J.—Multibox Parsers—ACM Sigplan Notices, Association for Computing Machinery, New York, vol. 29, No. 7, Jul. 1, 1994, pp. 54–60.

* cited by examiner

OUTLIERS (STUBS)
- INFREQUENTLY EXECUTED

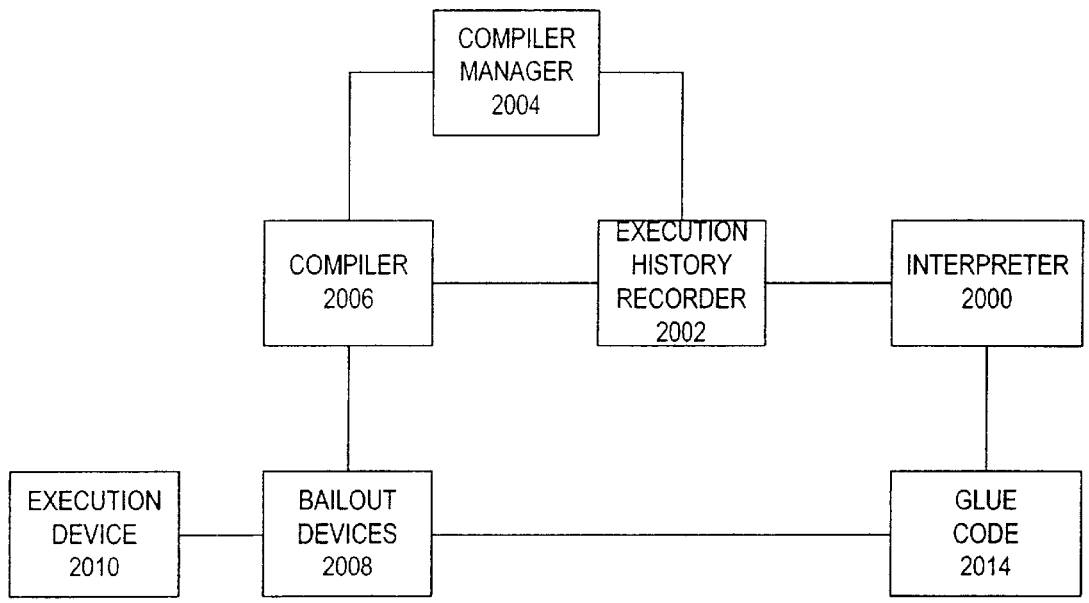
FIG. 2A
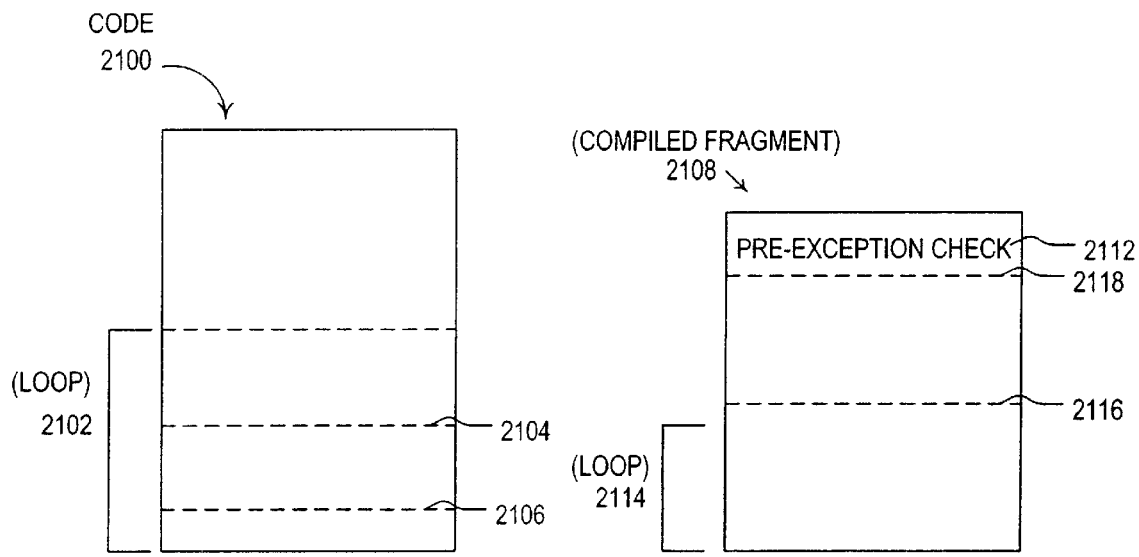
FIG. 2B
FIG. 2C empty stack 12602

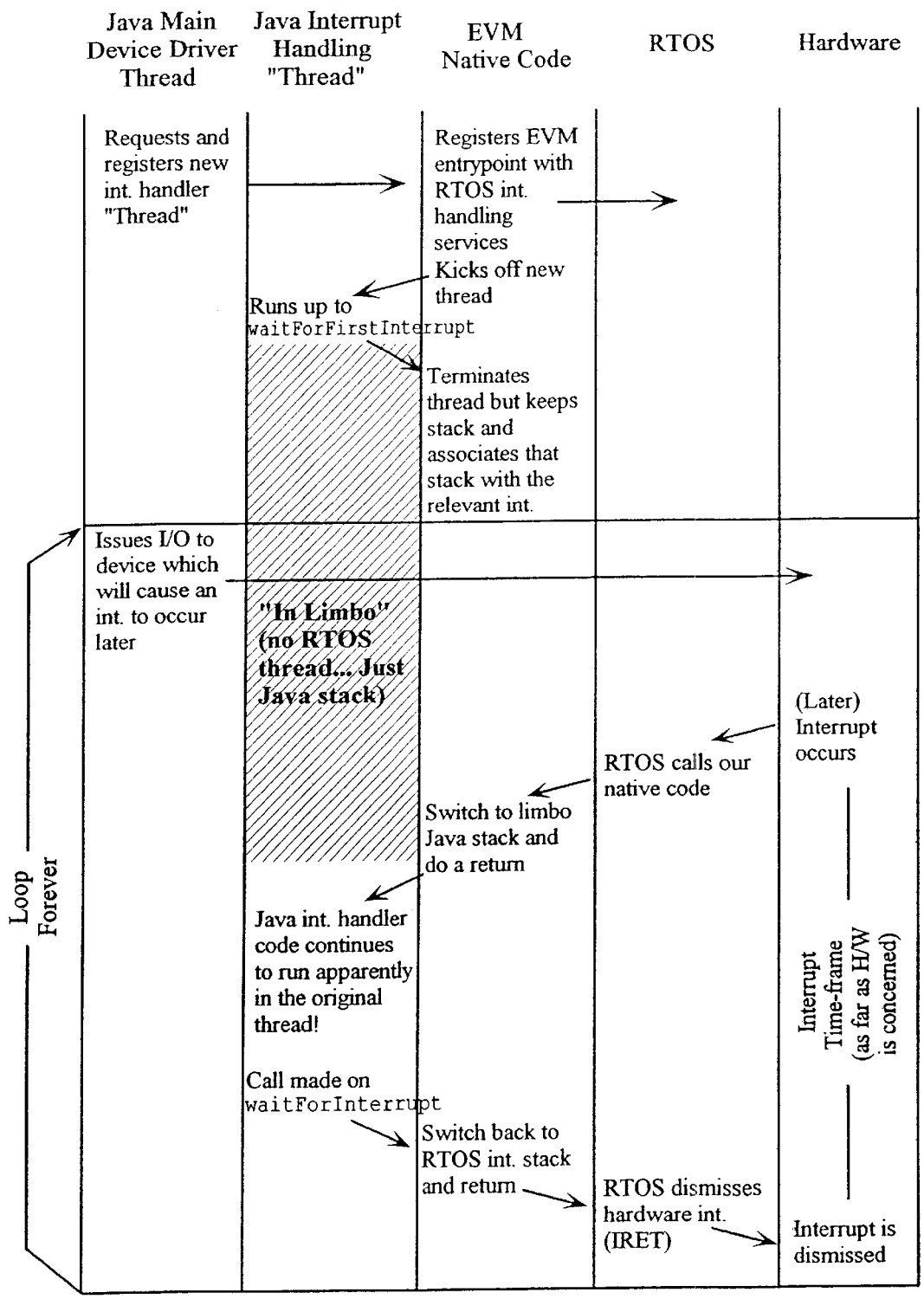
Fig. 8B Sequence of Events for Various System Components

*Fig. 8C-1*

Pseudo-code of a Java Interrupt Handler

```
public void run ( )
{
        // The run method of an example interrupt handling thread // Wait for the first interrupt
        if  ( !waitForFirstInterrupt ( ) )
        {
                throw new RuntimeException ( "Error waiting for 1st interrupt" ) ;
        }

// We are now running at interrupt level!

while (true)
        {
                // Now handle the interrupt that just occurred (this involves
                // reading a device register)

byte value = dev.readByte (DEV.DATA_REG);

if ( ( value & DEV.GOING_SYNC) != 0)
                {
                        // We enter a sub-loop handling interrupts while in
                        // "synchronous mode"

boolean stillSync = true;
                        do
                        {
                                // Wait for the next interrupt to occur waitForInterrupt ( ) ;

// Read the hardware data register value = dev.readByte (DEV.DATA_REG) ;
``` go to *Fig. 8C-2*

Fig. 8C-2

*from Fig. 8C-1*

```
            // Decide if the value means that we are switching back
            // to "async mode"

if ( (value & DEV.GOING_ASYNC) = = 0)
            {
                    // Handle "synchronous mode" interrupt here (just
                    // write the device data to non-interrupt code via
                    // the special channel)

specialChannel.write (value);
            }
            else
            {
                    // Wait for the next interrupt to occur then return
                    // to the outer "async" loop waitForInterrupt ( ) ;
                    stillSync = false;
            }
        }
        while (stillSync)
    }

// Handle "asynchronous mode" interrupts here (just write the
    // device data to non-interrupt code via the special channel)

specialChannel.write (value) ;

waitForInterrupt ( ) ;
    }
}
```

METHOD AND SYSTEM OF MEMORY MANAGEMENT USING STACK WALKING

CROSS-REFERENCE TO RELATED APPLICATIONS

This application claims priority from and is a continuation of International Application PCT/GB99/00788, filed on Mar. 16, 1999, which claims priority to U.K. Patent Application GB9825102.8, filed on Nov. 16, 1998, now abandoned. The foregoing disclosed applications, including all attached documents thereto, are incorporated by reference in their entirety for all purposes.

FIELD OF THE INVENTION

This invention relates, in its most general aspects, to a computer system and to a method of operating that system, and to improvements in the performance of various operations within such a system. It also relates to a computer-readable storage medium. The computer system may be, may include, or may be part of, a virtual machine. The computer-readable storage medium may contain executable code or other instructions for programming the computer system/virtual machine.

BACKGROUND OF THE INVENTION

In recent years, there have been developments in programming languages towards what is known as an object-oriented language. In these developments, concepts are regarded as 'objects', each carrying with it a set of data, or attributes, pertinent to that object, as well as information relating to so-called 'methods', that is functions or subroutines, that can be performed on that object and its data. This is well known to those skilled in the art of computing and/or programming.

The advent and rapid advancement in the spread and availability of computers has led to the independent development of different types of systems, such as the IBM and IBM-compatible PC running IBM-DOS or MS-DOS or MS-Windows applications, the Apple Macintosh machines running their own Apple System operating system, or various Unix machines running their own Unix operating systems. This proliferation of independent systems has led to useful applications being available only in one format and not being capable of running on a machine for which the application was not designed.

Under such circumstances, programmers have devised -software which 'emulates' the host computer's operating system so that a 'foreign' application can be made to run successfully in such a way that, as far as the user is concerned, the emulation is invisible. In other words, the user can perform all of the normal functions of say a Windows-based application on a Unix machine using a Unix-based operating system without noticing that he is doing so.

A particularly notable product of this type is that developed by Insignia Solutions of High Wycombe, GB and Santa Clara, Calif., USA and known under the name 'SoftWindows 2.0 for Powermac'. This software enables a physical Macintosh computer to emulate a PC having an Intel 80486DX processor and 80487 maths co-processor plus memory, two hard disks, IBM-style keyboard, colour display and other features normally found on recent versions of the PC-type of computer.

Furthermore, there is an ever-increasing demand by the consumer for electronics gadgetry, communications and control systems which, like computers, have developed independently of one another and have led to incompatibility between operating systems and protocols. For example, remote-control devices for video players, tape players and CD players have similar functions, analogous to 'play,' 'forward,' 'reverse,' 'pause,' etc, but the codes for transmission between the remote control, or commander, operated by the user may not be compatible either between different types of equipment made by the same manufacturer or between the same types of equipment made by different manufacturers. There would be clear benefits of having software within the equipment which can produce for example the correct 'play' code based upon a 'play' command regardless of the specific hardware used in the equipment. Such software is commonly known as a 'Virtual Machine.'

Other uses and applications are legion: for example, set-top boxes for decoding television transmissions, remote diagnostic equipment, in-car navigation systems and so-called 'Personal Digital Assistants.' Mobile telephones, for instance, can have a system upgrade downloaded to them from any service provider.

Emulation software packages tend to have certain features in common, notably that they are not general purpose but are dedicated. They are of most benefit in rapid development areas and have a distinct advantage in enabling manufacturers to cut costs. In particular, they can divorce software from the physical machine, i.e., the effect of the software in the physical machine can be altered by the emulating software without having to go into the machine's native software to implement those changes.

The specific object-oriented language used in some of the implementations described later is that known as Java (registered trade mark to Sun Microsystems Corporation). Some of the following implementations will enable Java to be used in smaller devices than is currently possible because of the improved performance and/or reduced memory footprint. Future uses projected for embedded software (virtual machines) include computers worn on the body, office equipment, household appliances, and intelligent houses and cars.

While it is recognised that there are clear advantages in the use of virtual machines, especially those using object-oriented languages, there are naturally areas where it is important and/or beneficial for some of the operations that are carried out within the system to be optimised. These may include reducing the memory requirement, increasing the speed of operation, and improving the 'transparency' of the system when embedded in another system. One of the principal aims of the inventions described herein is to provide a Virtual Machine which is optimised to work as quickly as possible within a memory constraint of, for example, less than 10, 5, 2 or even 1 Mbyte. Such a constraint is likely to be applicable, for example, to electronics gadgetry and other equipment where cost (or size) is a major constraint.

The invention relates to a method of and apparatus for examining memory in a computer system to allow a section of compiled code to be deleted, and to a method of and apparatus for deleting compiled code in a computer system. The invention finds particular (but not exclusive) application in the environment of a unified stack virtual machine in which stack walking allows compiled code to be deleted. In a preferred embodiment, the invention relates to stack walking to allow compiled code deletion in the multi-threaded environment of a unified stack virtual machine The invention applies preferably to virtual machines where compiled portions of the code being run in the virtual machine appear and need to be removed at various times in the execution of the virtual machine; for example, in a dynamically compiling virtual machine.

When executing code using a virtual machine, we have found that it is advantageous to produce a compiled version of some or all of the emulated code (see Agent's Reference No. 1 in this specification). We believe that it will sometimes be desirable or necessary to subsequently remove some or all of these compiled versions. Also we believe that it would be advantageous to use a single stack to support the stack requirements of both the emulated machine and also the needs of the virtual machine code itself, and to use a native call instruction to perform the equivalent of an emulated call (invoke) and use of a native return instruction to perform the equivalent of an emulated return in the code being run on the virtual machine.

Where a computer system has finished using memory which it has taken to perform a particular function we have found that it is in the interests of speed and efficiency that the used memory is returned as soon as possible for further use.

Currently known techniques for virtual machines would require that one or more of the optimising techniques listed in the background information section be not taken advantage of, or require explicit checks to be used which impair the efficiency of the system.

In particular, the deletion of compiled code from a system can give rise to problems. There may be a link from a section of compiled code which is not being deleted into a section of deleted code. Particular problems can arise because of the proposed use of a native call instruction (or equivalent) to emulate a call or invoke in the virtual machine; this would typically leave the address where execution is to continue once the called method is complete (the"return address") on that stack for that thread, at or near the stack point when the call or invoke is performed. If the native call instruction is part of a compiled version of a section of code, then the return address will point into the compiled version. This causes no problems until the point of deletion of the compiled version. The return address cannot be left pointing to where the compiled version used to be. If, during execution, a thread tried to return to the address where the compiled code used to be, an error would occur and execution by that thread would usually terminate. In such an arrangement, it would be necessary to perform a check at each place where a return is about to be performed to ensure that it is safe to perform a return operation.

The present invention seeks to mitigate this and/or other problems.

SUMMARY OF THE INVENTION

The solution to these problems in a preferred embodiment of the invention is, at the point of deletion of the compiled code, to perform an examination of the virtual machine, looking for cases where a return address exists in the stacks that points to a position within the piece of compiled code to be deleted, and to re-arrange the thread's stack contents to allow seamless continuation of execution of that thread without the compiled version of the code which is about to be deleted. The mechanism is preferably arranged such that the cost of the operation is borne at the time of deletion, with little or no extra cost at normal call/return time, since the relative frequency of the two situations is such that there are many more call/return operations than code deletion operations.

Accordingly, the invention in one aspect provides a method of examining memory in a computer system to allow a section of compiled code to be deleted, the method including:
  examining a frame of a stack in the computer system;
  identifying whether the frame contains a return address which is in the range of addresses of the section of compiled code; and
  altering the contents of the frame when such a return address is identified.

By carrying out the above method, the problems associated with leaving a return address pointing into a section of compiled code to be deleted can be overcome.

In a closely related aspect of the present invention, there is provided a method of deleting compiled code in a computer system, including:
  selecting a section of compiled code to be deleted;
  examining a frame of a stack in the computer system;
  identifying whether the frame contains a return address which is in the range of addresses of the section of compiled code;
  altering the contents of the frame when such a return address is identified; and
  deleting the section of compiled code.

Preferably any such return address is changed to the address of a piece of continuation code. The continuation code enables execution to continue after the return without the code to be deleted. Preferably, the continuation code is arranged to transfer control to an interpreter. The continuation code may be arranged so that subsequent instructions are interpreted, for example, until a section of emulated instructions is encountered for which there is a compiled version, or alternatively, to jump to a compiled version of the code to be deleted, if such a version exists. The use of a fallback interpreter for the execution of instructions subsequent to the return allows execution of the instructions of the deleted compiled code without the overhead of creating a new compiled version of the instructions.

If the frame contains such a return address, preferably, values in the frame are changed. Preferably, values in the frame are arranged to enable execution to continue without the code to be deleted. For example, temporary register information which is stored in the frame may be changed to take into account optimisations which were made when the code to be deleted was compiled. Such changes may be required, for example, where control is to be transferred to an interpreter for subsequent execution (see Agent's reference no. 1 of this specification).

Preferably the alteration of the frame is carried out at the time of deletion. Thus, none of the links and return addresses of the frame will point into the compiled code after deletion, and time consuming checks during execution can be avoided.

Preferably, a plurality of frames in the stack are examined. For example, all frames in the stack may be examined, or else, each frame which may contain a return address pointing into the section of compiled code is examined.

In a preferred embodiment of the invention, the computer system operates a multi-threaded environment. Each thread has its own stack.

Preferably, the stacks of a plurality of threads in the computer system are examined. For example, the stacks of all threads in the computer system may be examined, or else, the stack of every thread to which the code to be deleted may have had access is examined.

In this way it can be ensured that no return addresses point into the section of compiled code to be deleted.

It may be known that some threads cannot have had access to the section of compiled code to be deleted. Execution time can be saved by not examining the stacks of such threads.

For the thread of the stack being examined, however, it will often be necessary to stop the thread while the examination is carried out. Alternatively, a return barrier may be inserted to restrict the thread to certain sections of the code (see Agent's Reference No. 5 in this specification).

In another aspect of the present invention, there is provided a method of deleting compiled code in a computer system, including:

examining each frame of each stack of each thread in the system;

identifying whether a return address points to a portion of compiled code which is to be deleted; and rearranging the contents of each stack containing the return address so as to enable that thread to continue execution without that portion of the compiled code which is to be deleted.

In a further aspect of the invention, there is provided a method of deleting a section of compiled code in a computer system, the method including, examining the memory of the computer system identifying a link to the section of compiled code and altering the link.

The link to the section of compiled code is preferably a return address in a frame. Thus, the return address identified when examining a frame is preferably a return address which is in the range of addresses of the section of compiled code to be deleted.

Alternatively, or in addition, the examination of the memory may identify a patch or other jump to the compiled code to be deleted. The link may be a direct or an indirect link to the compiled code to be deleted. For example, the link may be via a section of glue code to the section of compiled code.

Preferably, the computer system is configured as a virtual machine.

In a further aspect of the present invention, there is provided an apparatus for examining memory in a computer system to allow a section of compiled code to be deleted, including:

means for examining a frame of a stack in the computer system;

means for identifying whether the frame contains a return address which is in the range of addresses of the section of code to be deleted; and means for altering the contents of the frame.

In another aspect of the present invention there is provided apparatus for deleting compiled code in a computer system, including:

means for selecting a section of compiled code to be deleted;

means for examining a frame of a stack in the computer system;

means for identifying whether the frame contains a return address which is in the range of addresses of the section of compiled code to be deleted;

means for altering the contents of the frame; and means for deleting the section of compiled code.

The apparatus may further include means for executing subsequent instructions, and the means for arranging the contents of the frame may be adapted to change any such return address to the address of the means for executing subsequent instructions. Preferably, the apparatus further includes a fallback interpreter. The means for executing subsequent instructions may be arranged to interpret subsequent instructions until a section of emulated instructions is encountered for which there is a compiled version.

The means for arranging the contents of the frame may be adapted to alter values in the frame to enable execution to continue without the code to be deleted, if the frame contains such a return address.

In a preferred embodiment of the invention, a record is kept of the optimisations which have been carried out in compiling code so that "clean up" information will be available as to what alterations are required to update the values to allow for the subsequent execution, for example, by the interpreter. For a computer system including the apparatus, preferably the system further includes a compiler system, the compiler system including a recorder for recording "clean up" information as the code is compiled.

The means for examining a frame in the stack may be adapted to examine a plurality of frames in the stack. The means for examining a frame in the stack may be adapted to examine the stack of each of a plurality of threads in the computer system.

The invention also provides a virtual machine including the apparatus described above.

The invention further provides a computer system including the apparatus described above.

In another aspect, the invention provides a computer system including means for deleting compiled code, further including means for examining each frame of each stack of each thread in the system, means for identifying whether a return address points to a portion of compiled code which is to be deleted, and means for rearranging the contents of each stack containing the return address so as to enable that thread to continue execution without that portion of compiled code about to be deleted.

The invention further provides a computer-readable storage medium having a programme recorded thereon for carrying out a method as described above.

The features of any of the above aspects may be provided with any other aspect, in any appropriate combination. Apparatus features may be applied to the method aspects and vice versa.

BRIEF DESCRIPTION OF THE DRAWINGS

Preferred features of the present invention will now be described, purely by way of example, with reference to the accompanying drawings (which represent schematically the above improvements), in which:

FIGS. 2A–2C show code fragments and an apparatus for performing an exception check.

FIGS. 8A–8D show a system and method for handling interrupts.

DETAILED DESCRIPTION OF THE INVENTION

Figure 1:
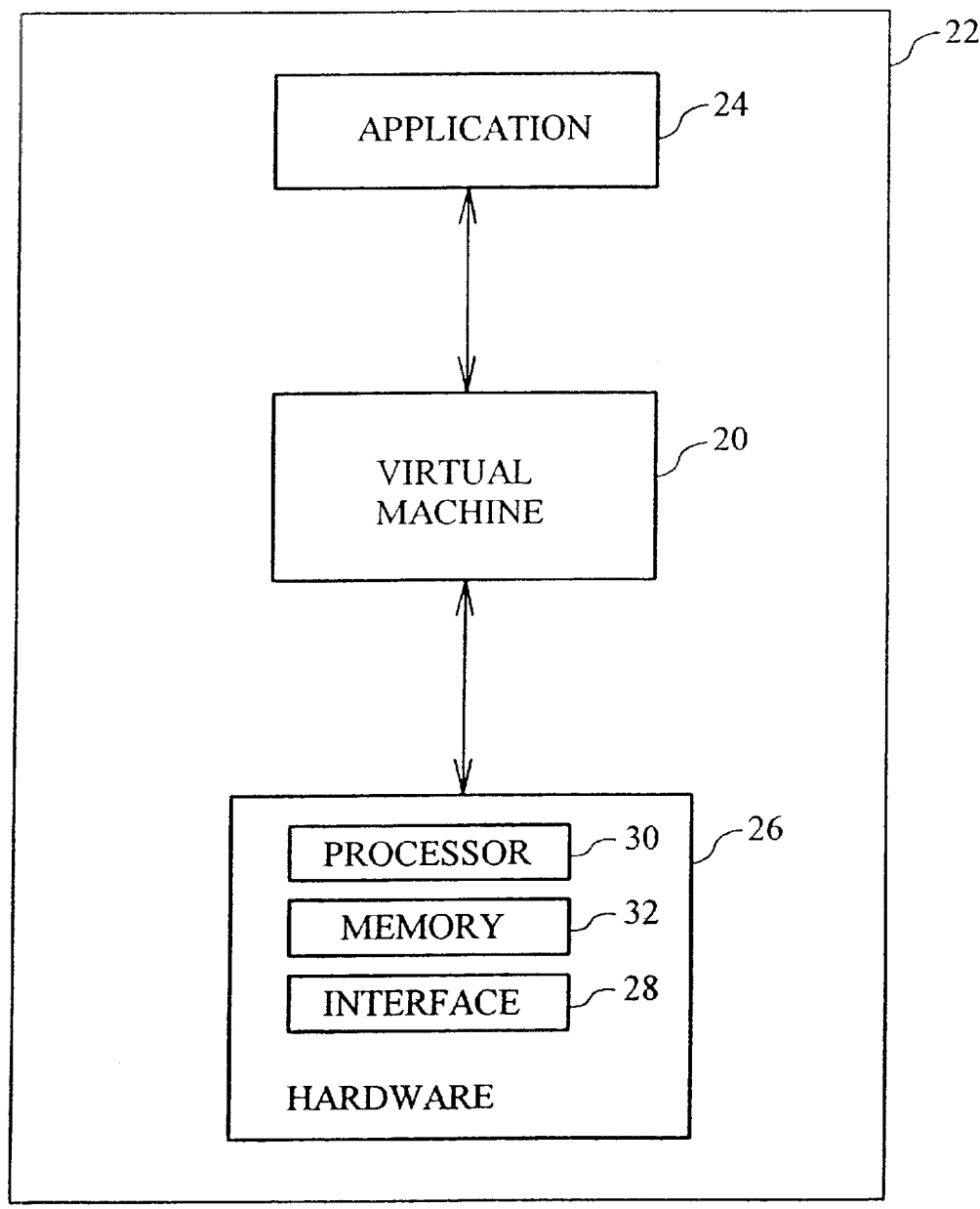
FIG. 1 shows certain components of the virtual machine.
Figure 1A:
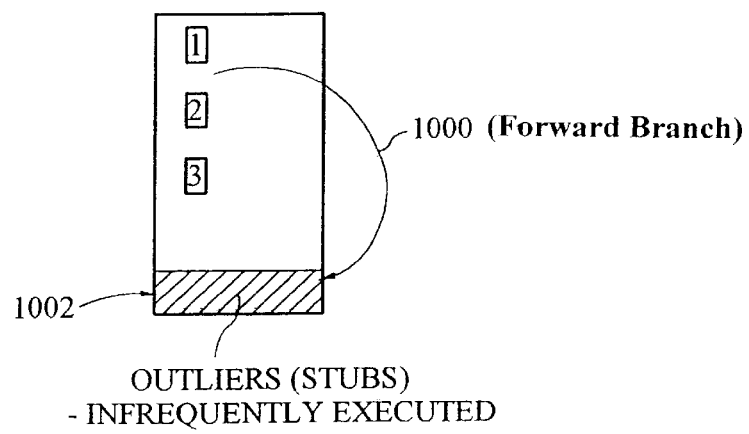
Figure 1B:
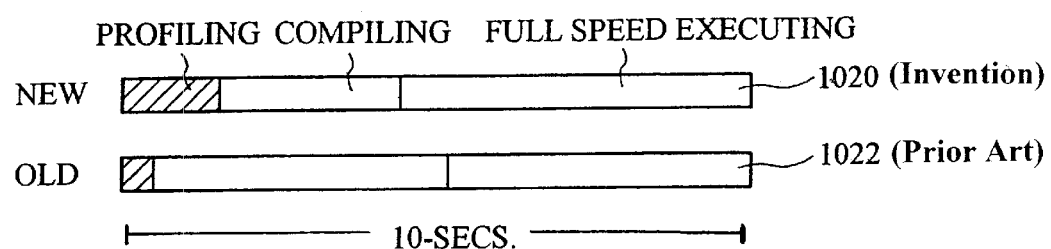
Figure 1C:
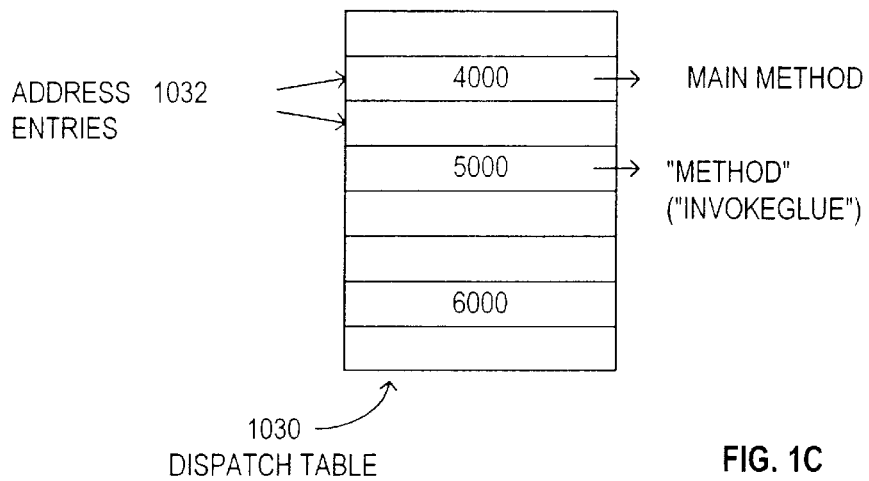
Figure 1D:
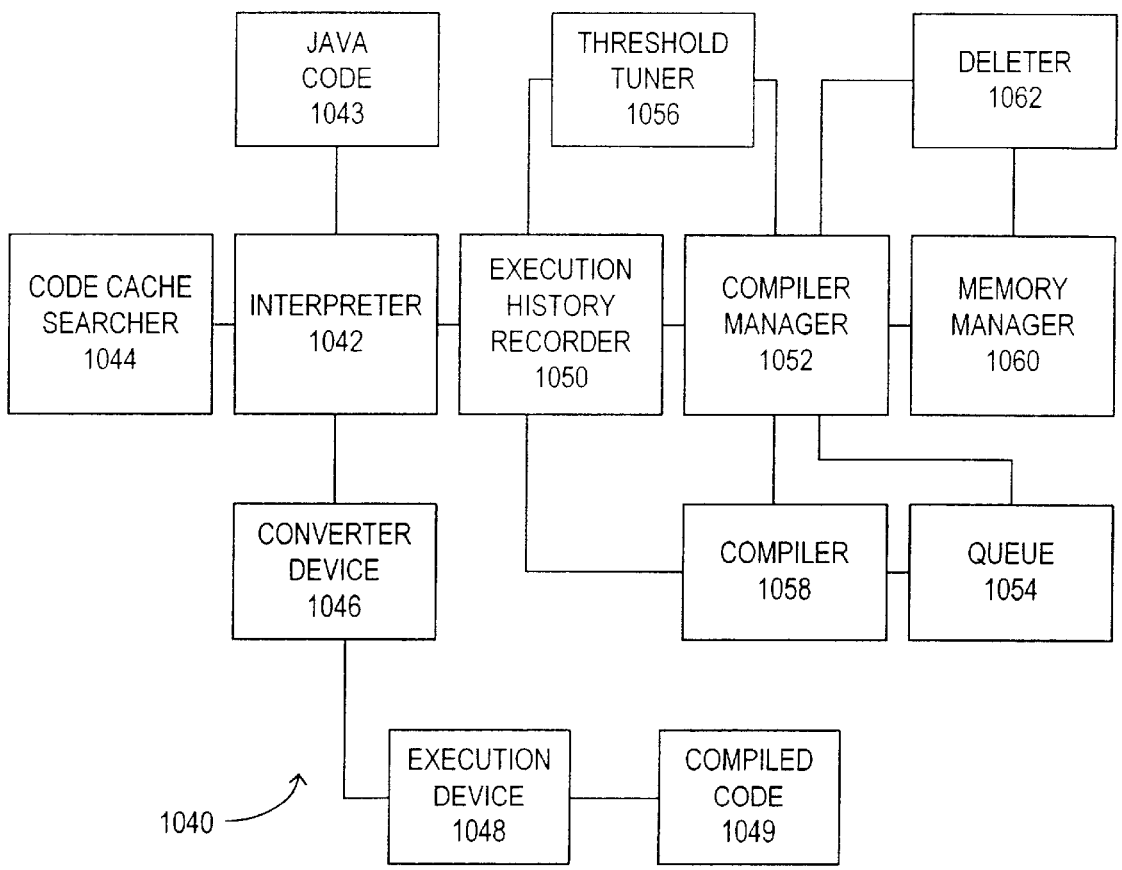
Figure 1E:
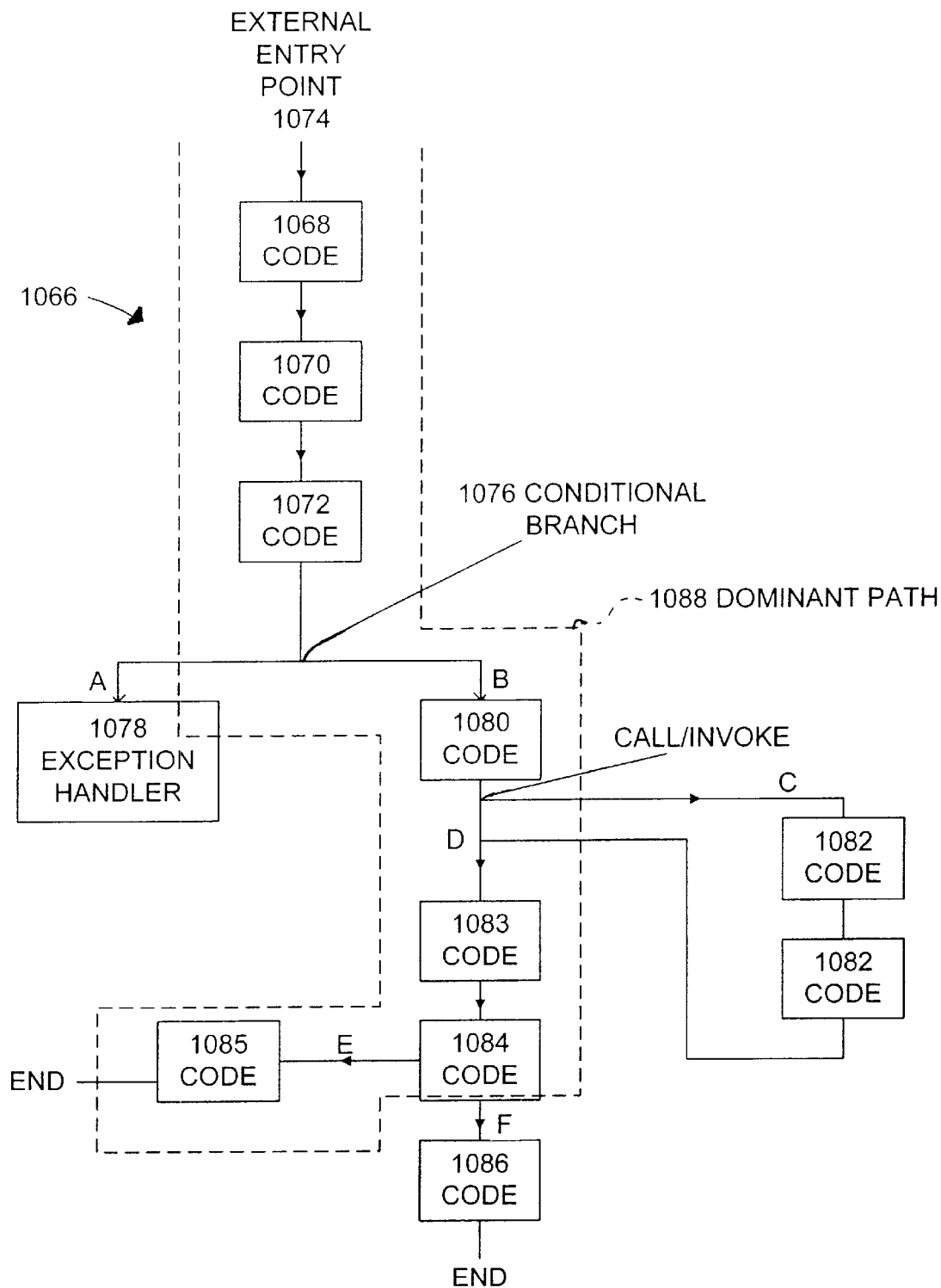
Figure 3A:
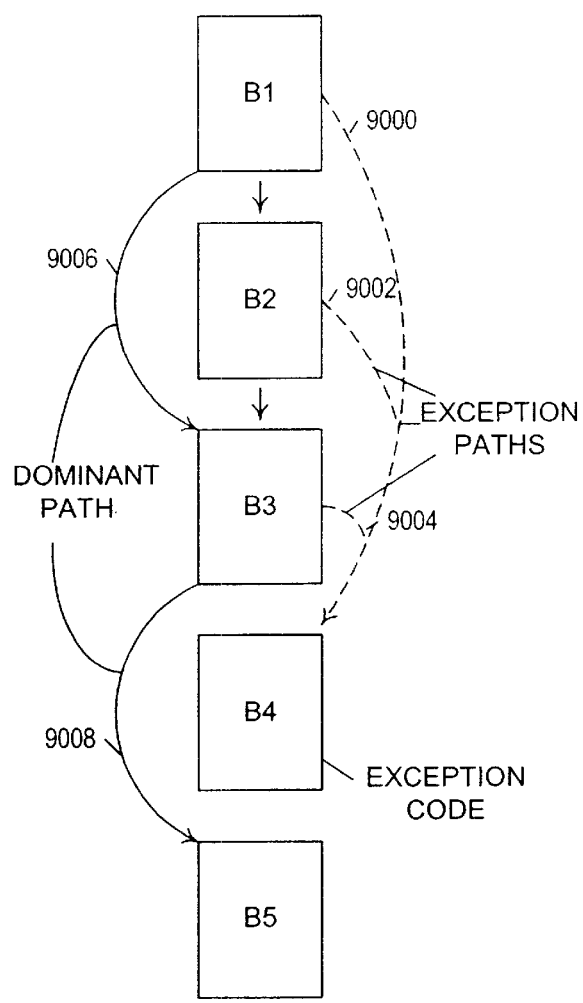
FIGS. 3A–3F show code fragments in execution paths and in a buffer as well as an apparatus for executing the code fragments.
Figure 3B:
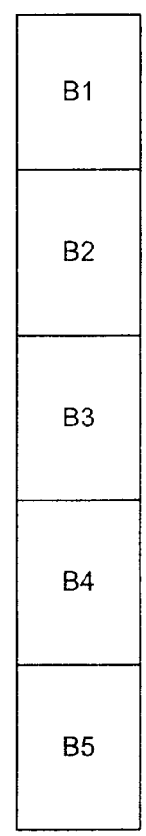
Figure 3C:
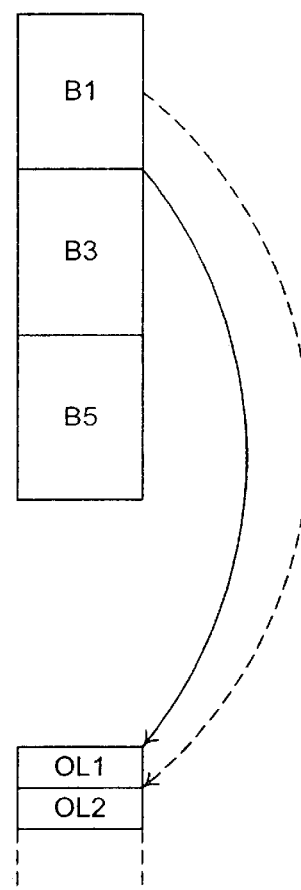
Figure 3D:
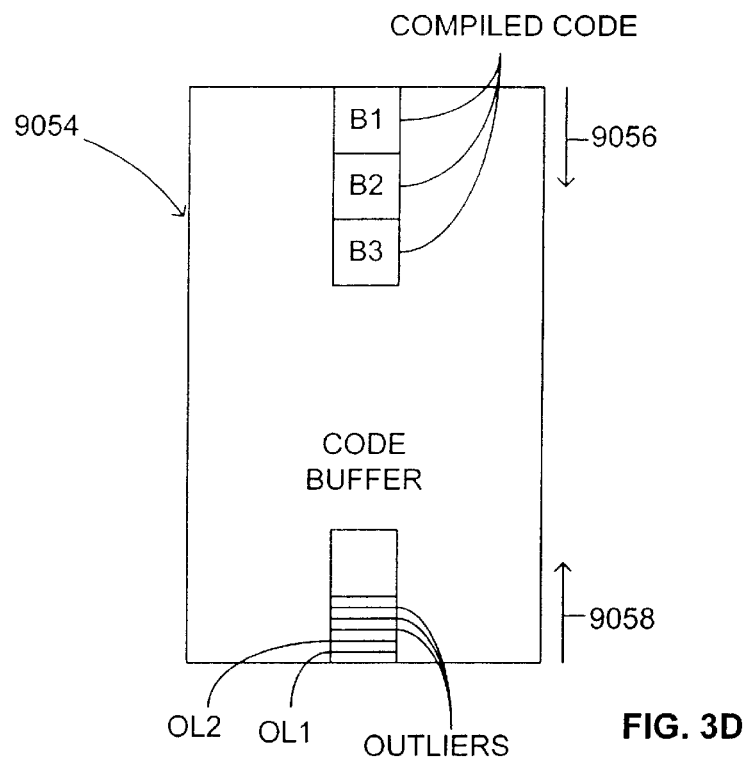
Figure 3E:
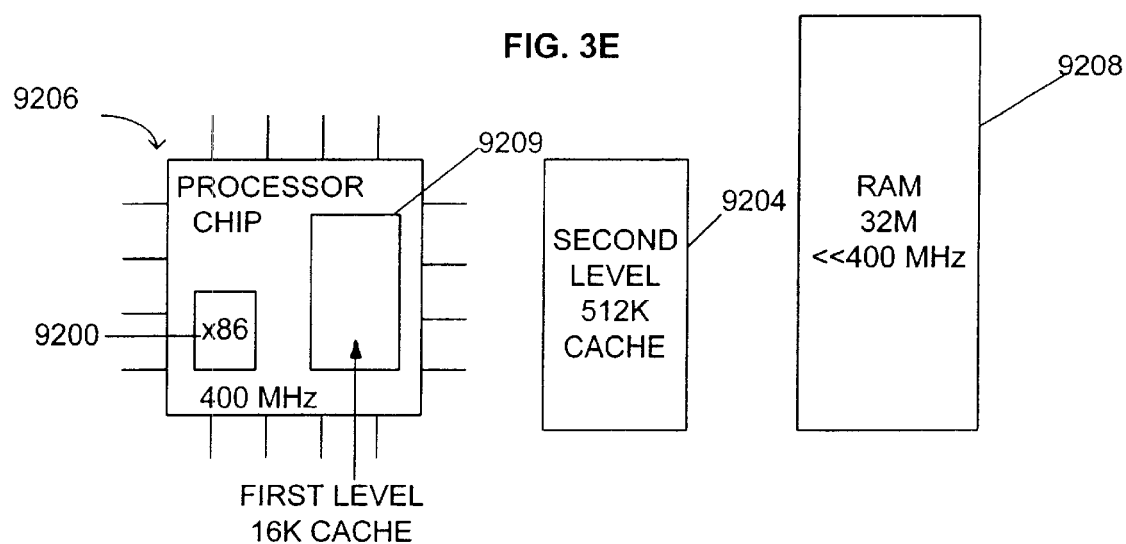
Figure 3F:
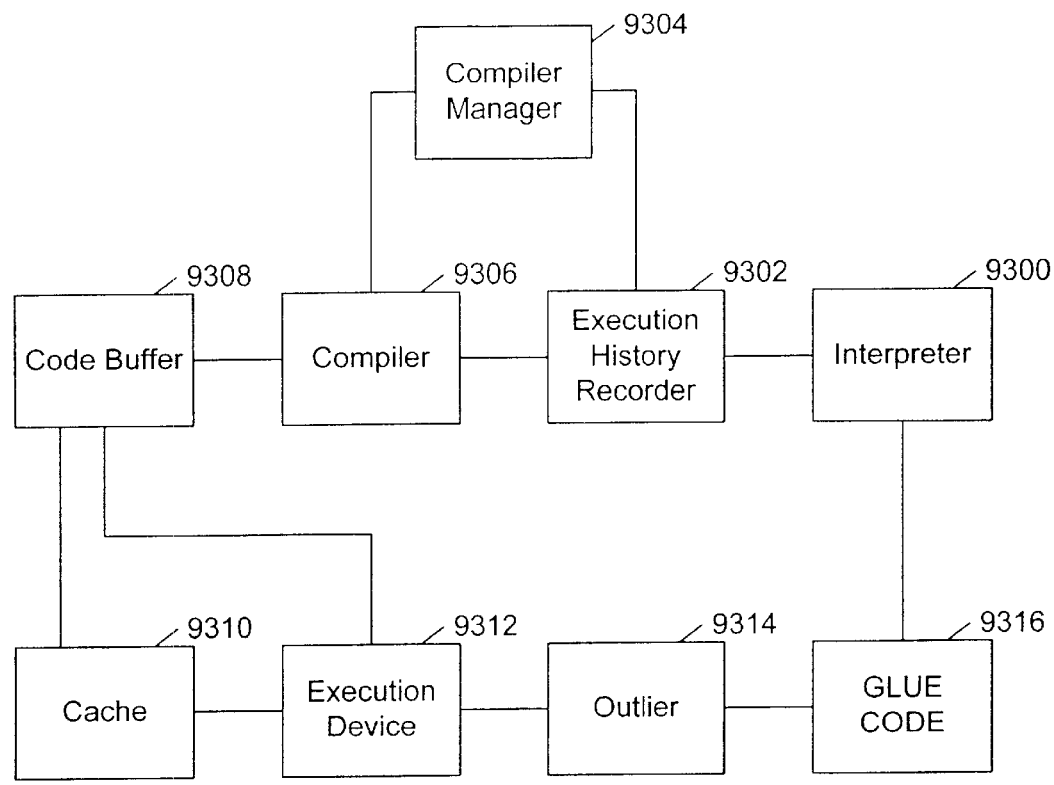
Figure 4A:
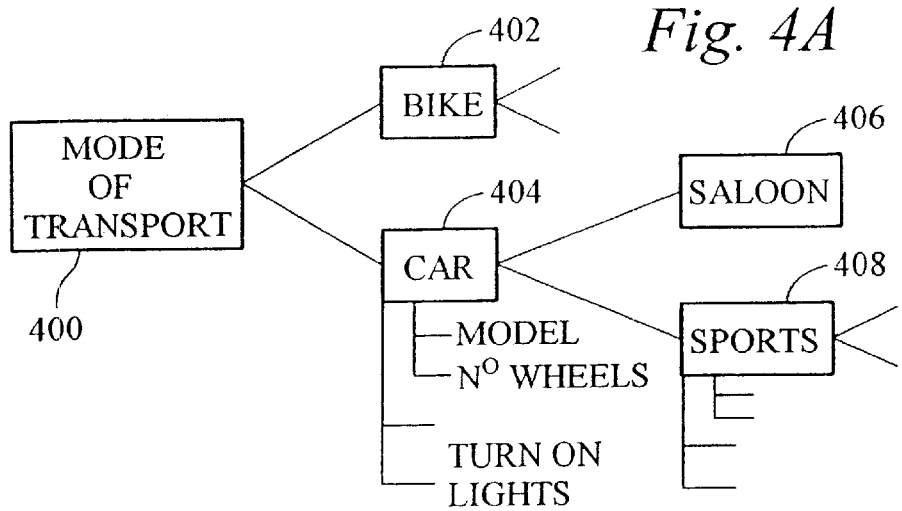
FIGS. 4A–4F show data structures and an apparatus for using dispatch tables.
Figure 4B:
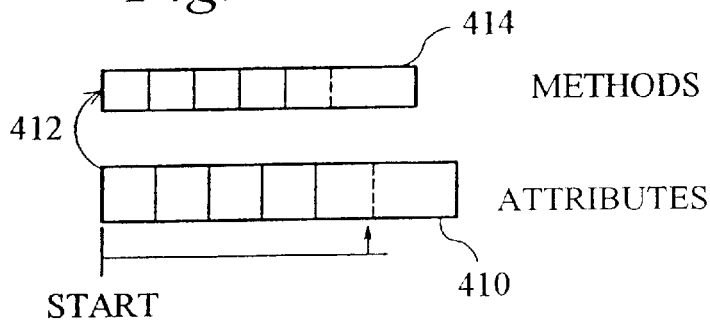
Figure 4C:
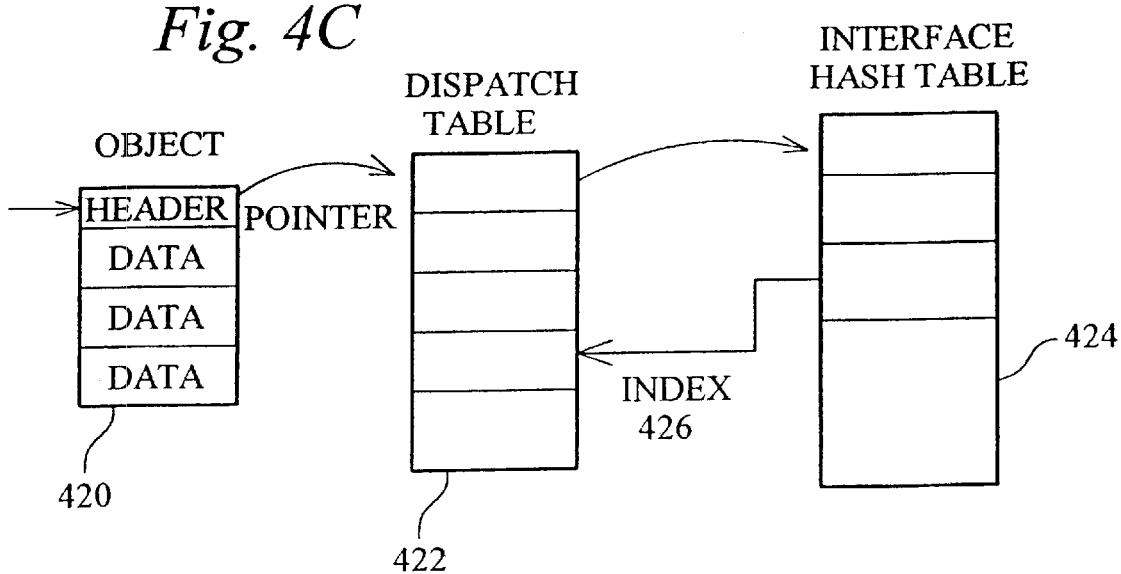
Figure 4D:
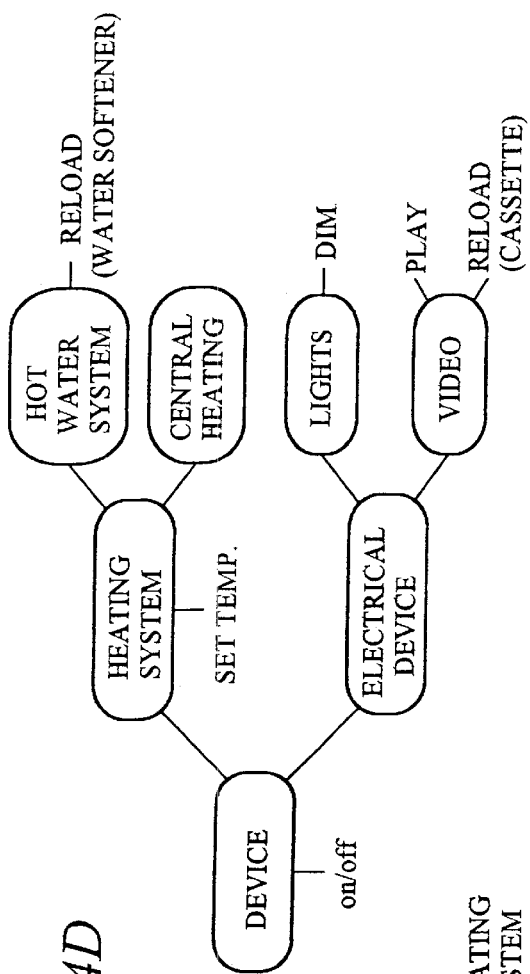
Figure 4F:
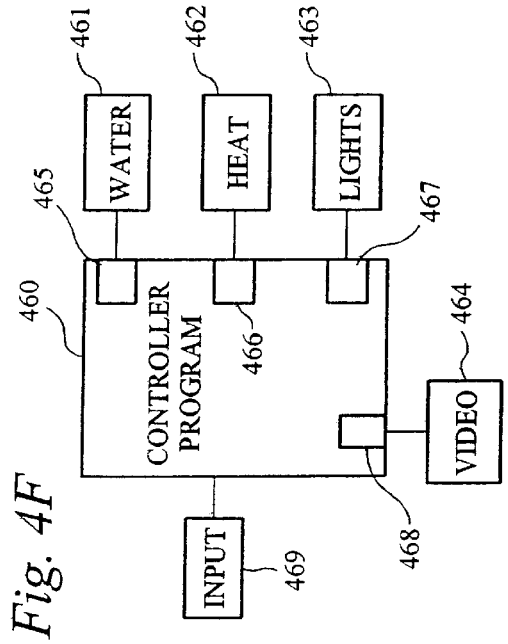
Figure 4E:
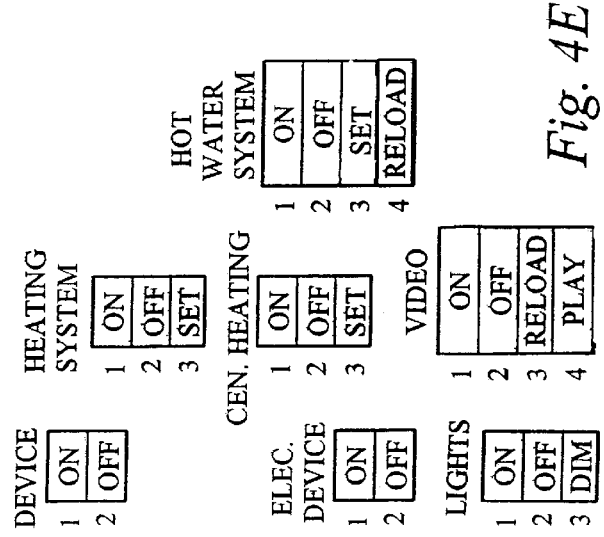
Figure 5A:
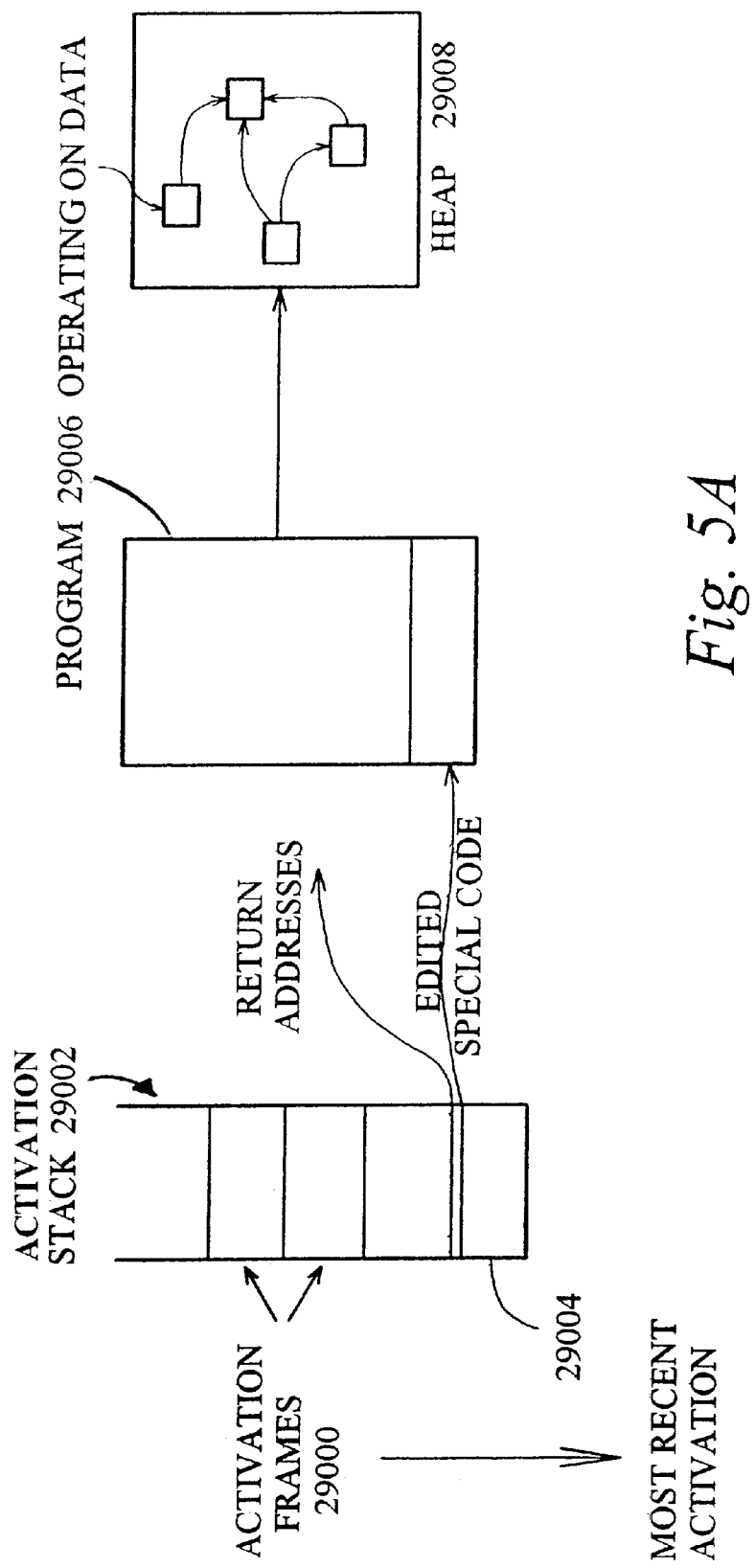
FIGS. 5A–5F show frames for the storage of data in a stack for use during garbage collection.
Figure 5B:
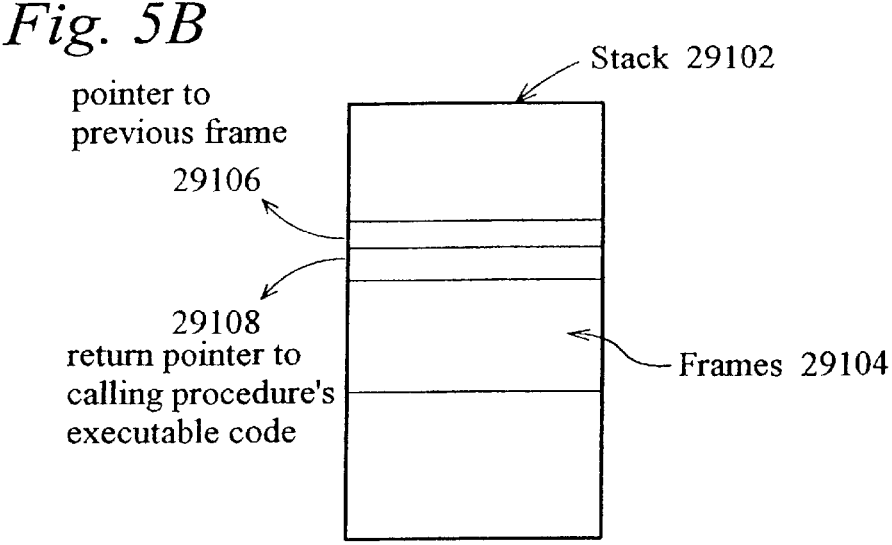
Figure 5C:
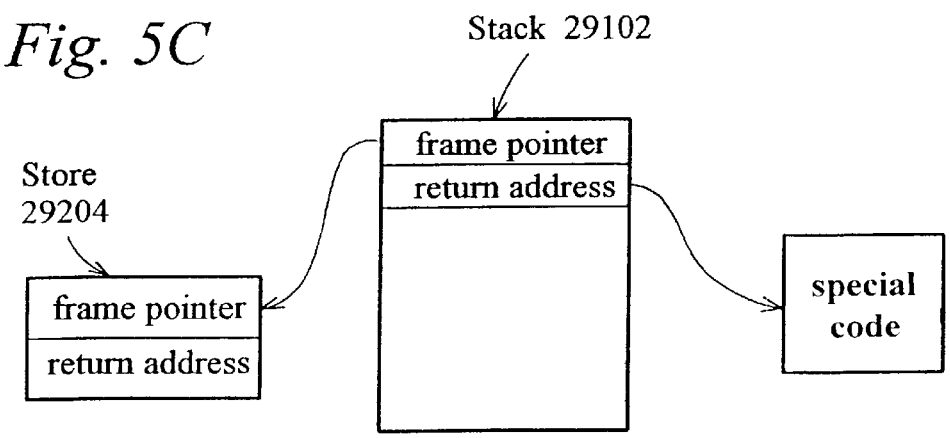
Figure 5D:
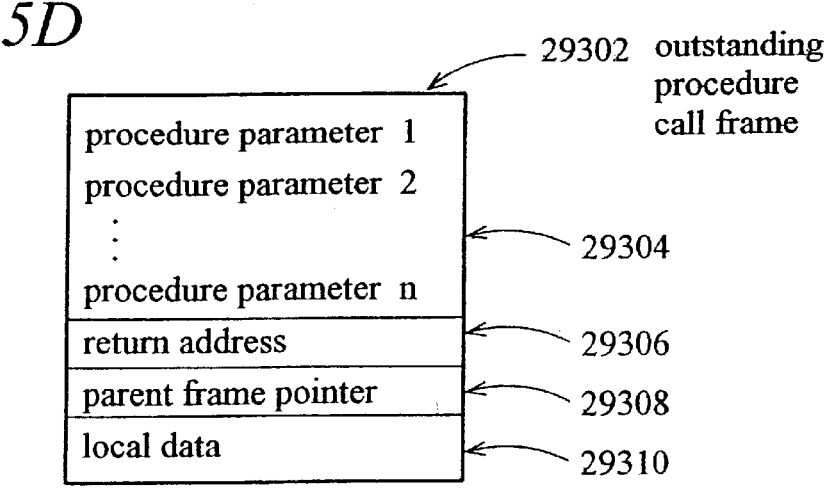
Figure 5E:
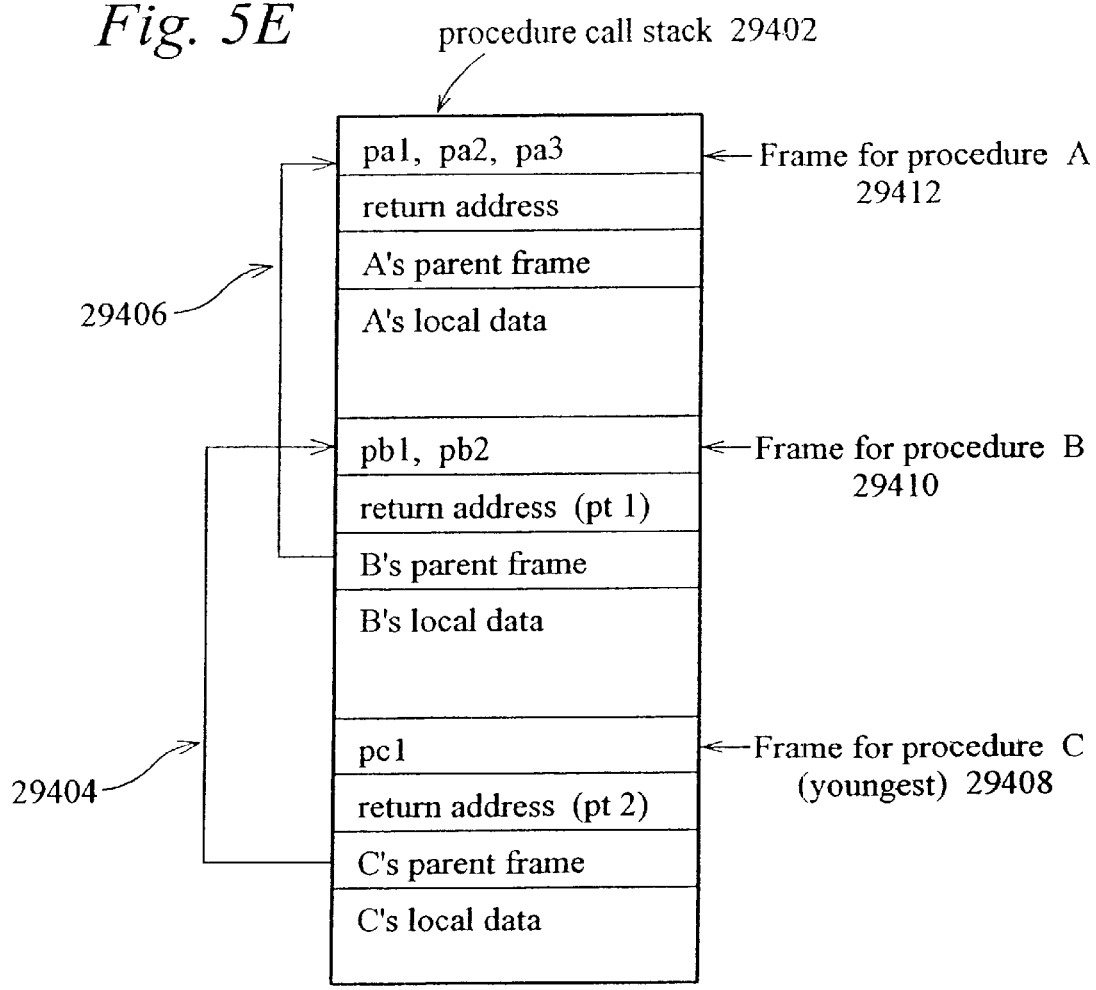
Figure 5F:
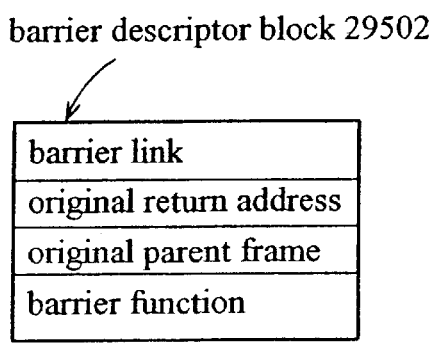

A specific example of a preferred embodiment of virtual machine is now described with reference to FIG. 1.

The virtual machine 20 is an executable code installed in the particular item of equipment 22. It can provide a degree of independence from the hardware and operating system. The virtual machine may typically include any, some, or all of the following features: an operating engine, a library of routines, one or more interpreters, one or more compilers, storage means for storing a plurality of instruction sequences, queue management means, and buffer management means.

The virtual machine is coupled to one or more applications 24 on one side (the "high level" side), and, on the other side (the "low level" side), perhaps via various intermediate logical units, to the hardware 26 of the item of equipment. The hardware can be regarded as including various ports or interfaces 28 (perhaps an interface for accepting user input); the virtual machine receives events from those ports or interfaces. The hardware also includes one or more processors/control means 30 and memory 32.

Figure 6A:
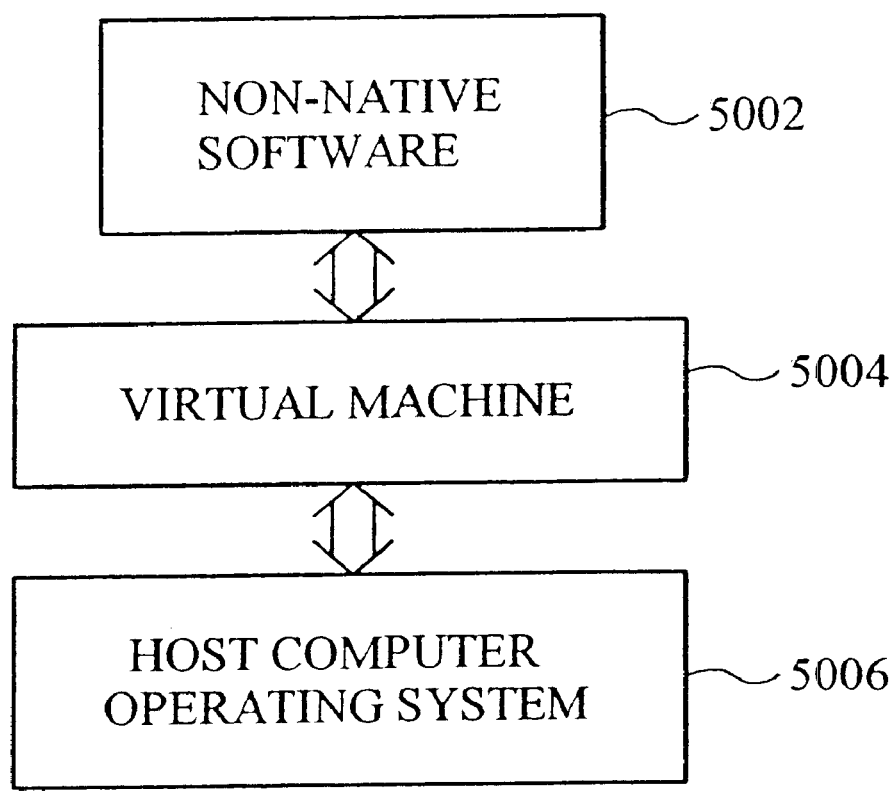
FIG. 6A illustrates the principle of a virtual machine.

A virtual machine allows software which has been written for one operating system to run on another operating system; the software is then termed 'non-native' software. In order to allow the non-native software to run, the virtual machine emulates the operation of the operating system for which the software was written. This situation is illustrated in FIG. 6A. The virtual machine 5004 translates the instructions of the non-native software 5002 into native instructions which can be run by the host operating system 5006. Conventional emulators work by interpreting the non-native instructions during execution.

Any execution path, or 'thread,' will have a stack associated with it. A stack is an area in memory that stores frames consisting of temporary register information and return addresses of subroutines. In the conventional emulator, the non-native application has its own stack (the emulator stack) separate from the stack of the host operating system.

Figure 6B:
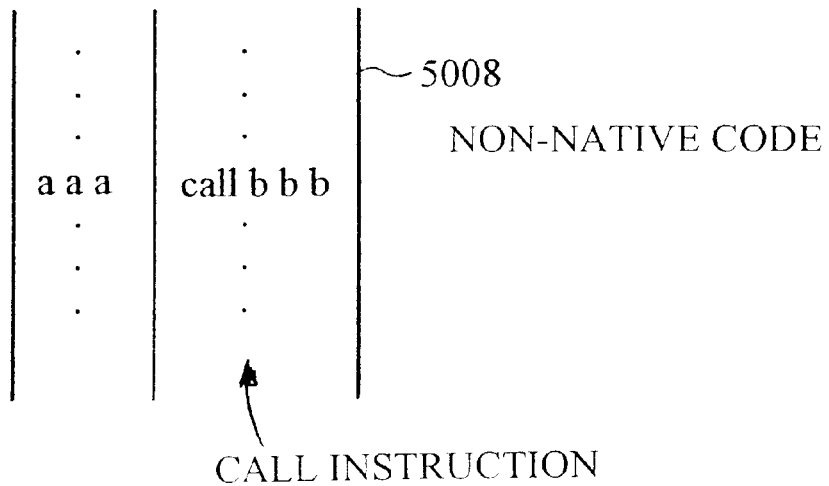
FIG. 6B illustrates the operation of an emulator stack.
Figure 6B:
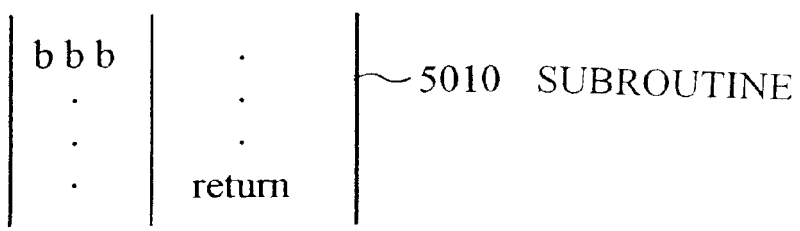
Figure 6B:
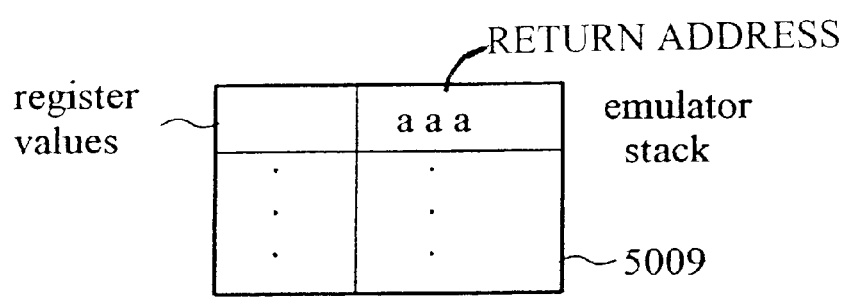

An example of the operation of the emulator stack is shown in FIG. 6B. Referring to that Figure, a section of non-native code 5008 has a call instruction at address aaa which calls a subroutine 5010 located at address bbb. When the emulator encounters the call instruction, the address aaa (the return address) is put onto the emulator stack 5009, together with temporary register information, and the path of execution then jumps to address bbb. At the end of the subroutine the emulator encounters a return instruction. It then takes the return address from the stack, together with the register information, and returns to the instruction following the call instruction in the main routine.

In the virtual machine of the preferred embodiment, rather than interpreting the nonnative instructions, part or all of the instructions are compiled into native instructions that can run on the host operating system. Although a certain amount of time is required for the compilation, significant time savings can made when running the compiled code.

Time savings can be made in various ways. Firstly, if a section of code is to be executed more than once, then it will be more efficient to execute a compiled version. Secondly, as described above in Agent's reference no. 1 of this specification, various assumptions may be made during compilation that allow optimisation of the compiled code. Thirdly, time savings can be made by using the host operating system's stack, and by using native call instructions (rather than emulated call instructions) to call subroutines.

Figure 6C:
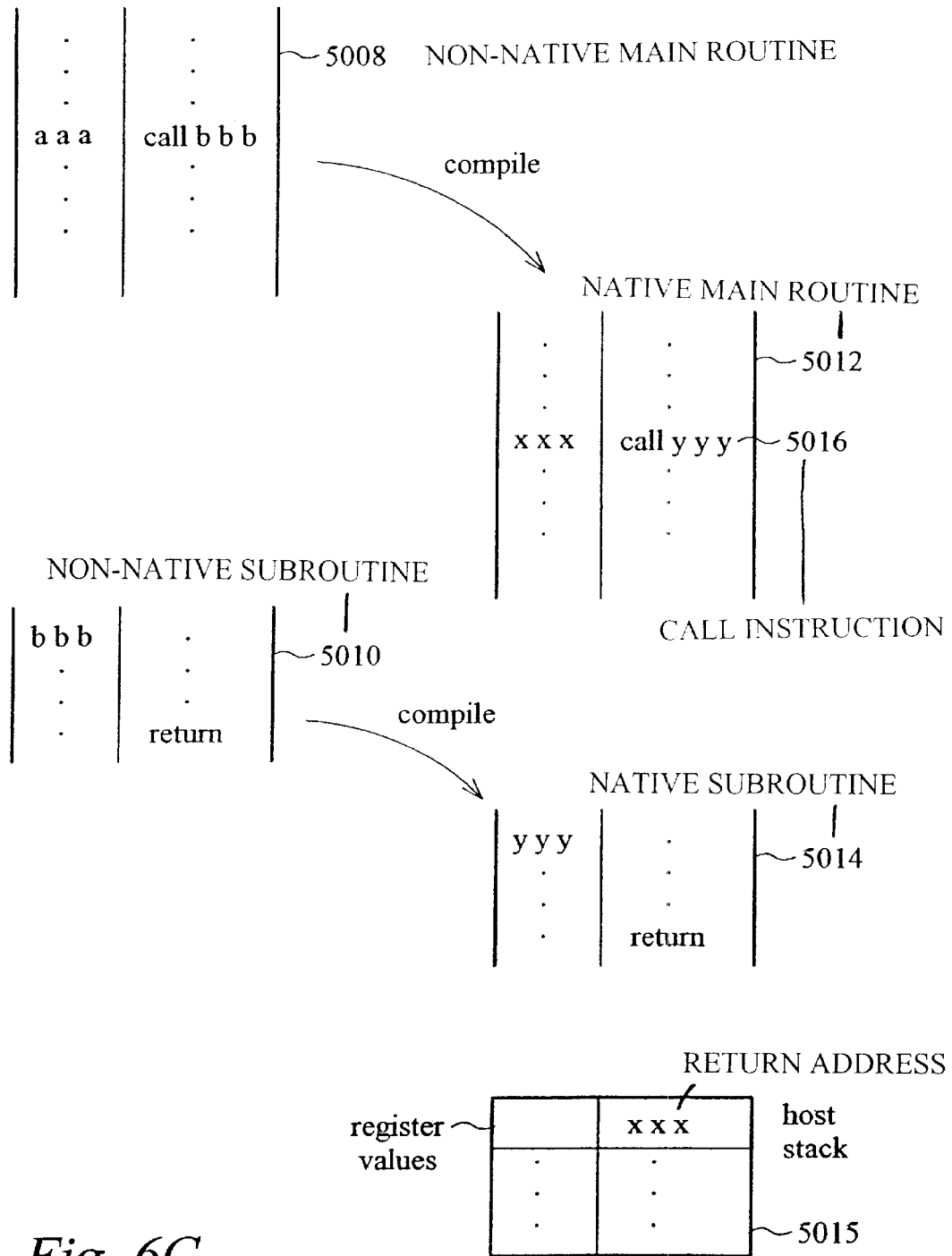
FIG. 6C illustrates the operation of a unified stack.

Referring to FIG. 6C, non-native main routine 5008 and non-native subroutine 5010 are compiled into native main routine 5012 and native subroutine 5014. Call instruction 5016 at address xxx is a native call instruction. When this call instruction is encountered, the address xxx (the return address) is put onto the host stack 5015, together with temporary register values, and the instructions in the subroutine at address yyy are picked up. When the return instruction at the end of the subroutine is encountered, the return address and register values are pulled from the host stack, and execution of the main routine resumes.

When using compiled code in the way described above, in some circumstances it may be desirable or necessary to delete certain sections of compiled code. This may be because the memory area in which the compiled code is stored is required elsewhere, or because assumptions that where made during compilation are no longer valid. Also, it is desirable to remove any code which is not expected to be required in the future, particularly when working in a limited memory environment.

A problem arises if a section of compiled code is discarded while the processor is executing a subroutine that has been called from that section of code. In this situation, a return address is left on the stack which points to a section of code that no longer exists.

According to the preferred embodiment, prior to deletion of a section of compiled code, the stack is examined frame by frame to identify any return addresses that point to the section of code to be deleted. If such a return address is identified, the address is changed to the address of a piece of continuation code referred to herein as 'glue code'. The glue code enables execution to continue without the piece of code to be deleted. This is done either by interpreting instructions in the original, non-native code until a section of code is encountered for which there is a compiled version, or by jumping to another compiled version of the code, if this exists.

A discussion of the use of glue code and the transfer of execution between compiled and non-compiled code, and between compiled and compiled code, can be found in Agent's reference no. 1 of this specification.

As noted above, when a subroutine is called, temporary register information is also put onto the stack, in the same frame as the return address. Since various optimisations may have been made during the compilation of the code, this register information may only be valid if the rest of the compiled code is executed. For example, when a section of code is compiled, the compiler may have identified that not all parameters are needed in that section of code. In that case, some of the register information may have been left out, since it is not needed for executing the rest of the compiled code. However, if execution then returns to the original interpreted code, all of the parameters are needed (since the interpreter cannot look forward to see which parameters are or are not needed). Thus, it may be that missing register information needs to be added, before the interpreted version of the code can be executed.

The problem of incorrect register information could be avoided by making sure that, when a subroutine is called, all of the register information which is put on the stack is valid even if the rest of the compiled code were not executed. Alternatively, when optimisations are made which affect the register information, this fact could be recorded, together with the necessary information to allow the optimisations to be undone, should the rest of the compiled code not be executed. When a frame with a return address is identified, the glue code can then examine the optimisations which have been made, and change the register information in that frame, where necessary.

The preferred embodiment is designed to operate in a multi-threaded environment, that is, an environment in which there are two or more processors, or threads, running asynchronously but sharing the same work space. Each thread has its own stack. In the preferred embodiment, the stack of every thread to which the compiled code may have had access is examined, or simply the stack of every thread is examined.

In order to examine a stack, the thread to which that stack relates is stopped for a certain period of time. In one example, the thread is stopped while all of the frames in the stack are examined. In another example, the thread is paused for long enough to examine the most recent frame, or a predetermined number of most recent frames, on the stack. Once these frames have been examined, a 'return barrier' is inserted into the stack, in the way described in Agent's reference no. 5 of this specification. The thread can then be allowed to continue execution for as long as the stack stays above the return barrier.

Figure 6D:
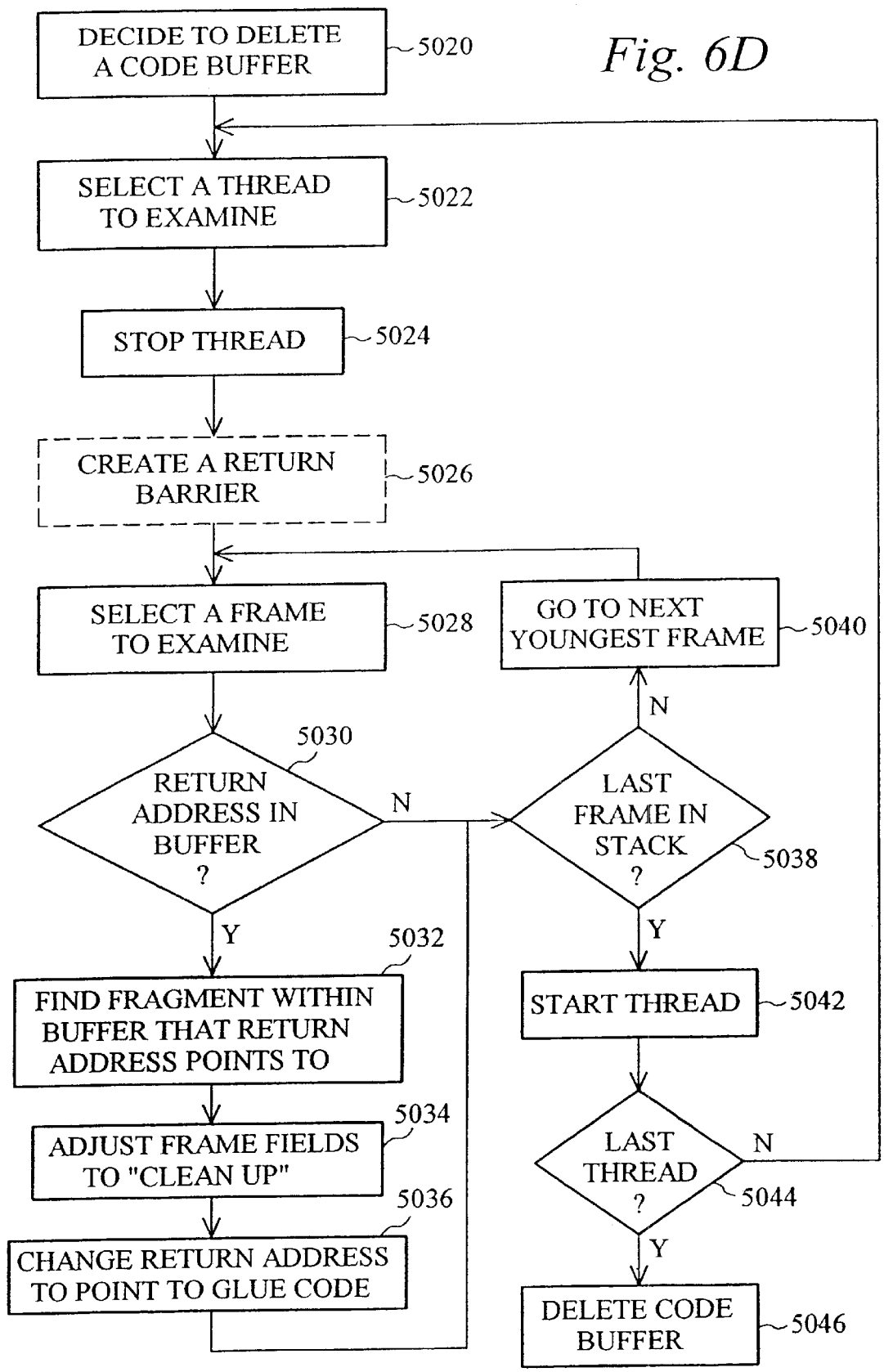
FIG. 6D shows an embodiment of the present invention.

Referring to FIG. 6D, operation of a preferred embodiment will now be described.

In step 5020 it is decided that a certain code buffer is to be deleted. A code buffer is an area in memory that stores compiled code. In step 5022 a thread is selected whose stack is to be examined. In step 5024 that thread is stopped. Optionally, in step 5026, a return barrier is inserted into the stack, and operation of the thread allowed to continue for as long as the stack stays above the return barrier.

In step 5028 a frame on the stack is selected. The first frame to be examined will typically be the youngest frame on the stack. In step 5030 the selected frame is examined to see whether it contains a return address in the buffer that is to be deleted.

If it is found that there is such a return address, then in step 5032 the fragment within the buffer that the return thread points to is identified. In step 5034 the other frame fields are adjusted to 'clean up' any optimisations of local variable values, or of variables specific to the virtual machine, that may have been made. In step 5036 the return address is changed to point to a piece of glue code.

If the frame contains no return address into the buffer to be deleted, or once the values in the frame have been adjusted, then in step 5038 it is determined whether all frames in the stack have been examined. If not, then in step 5040 the next youngest frame in the stack is selected, and that frame is examined. Once all of the frames in the stack have been examined, then in step 5042 the thread is restarted, or the return barrier is removed. In step 5044 it is determined whether the stacks of all threads have been examined. If not, then another thread whose stack has not been examined is selected and the process is repeated.

Once all of the frames in all of the stacks in all of the threads have been examined and the appropriate changes to the stack contents have been made, then in step 5046 the code buffer is deleted.

Figure 6E:
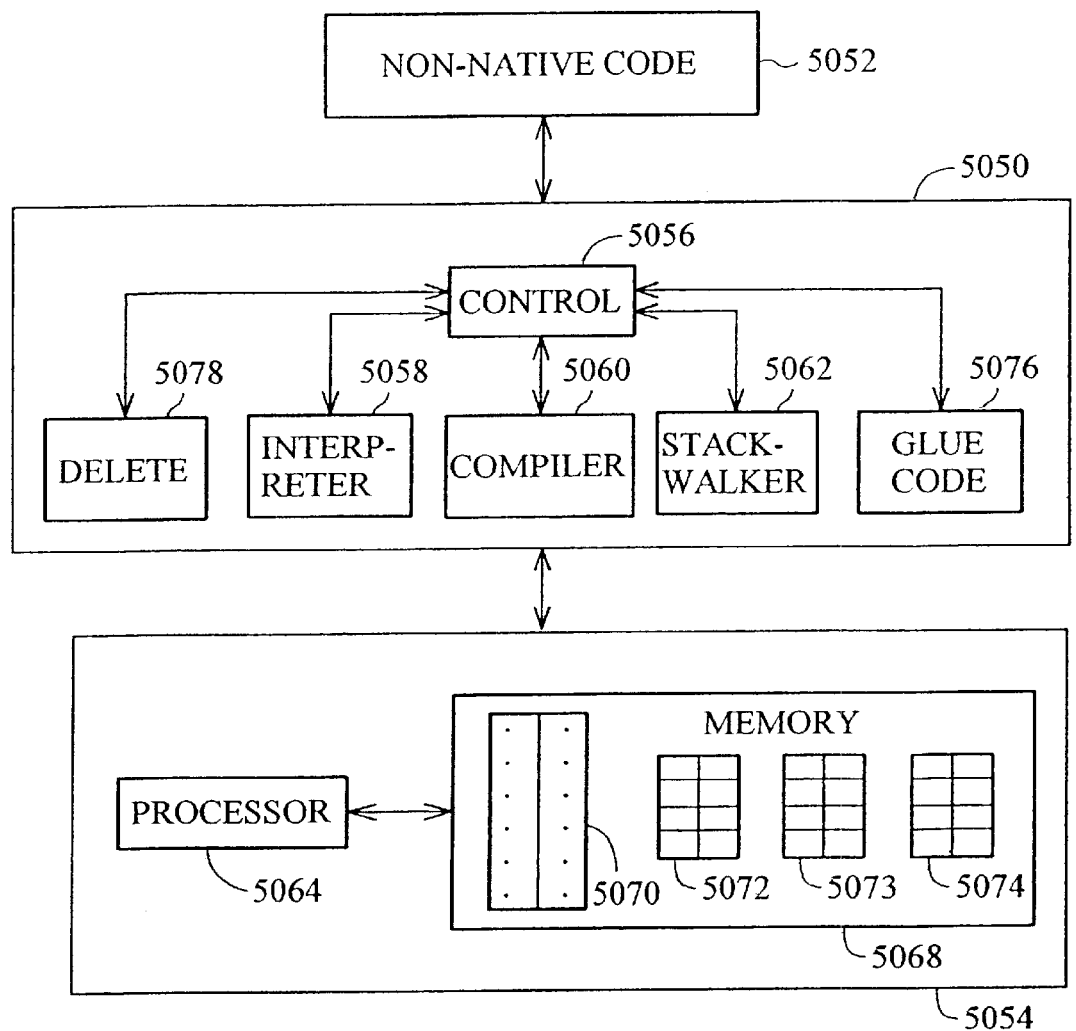
FIG. 6E shows an apparatus embodiment of the present invention.
Figure 7A:
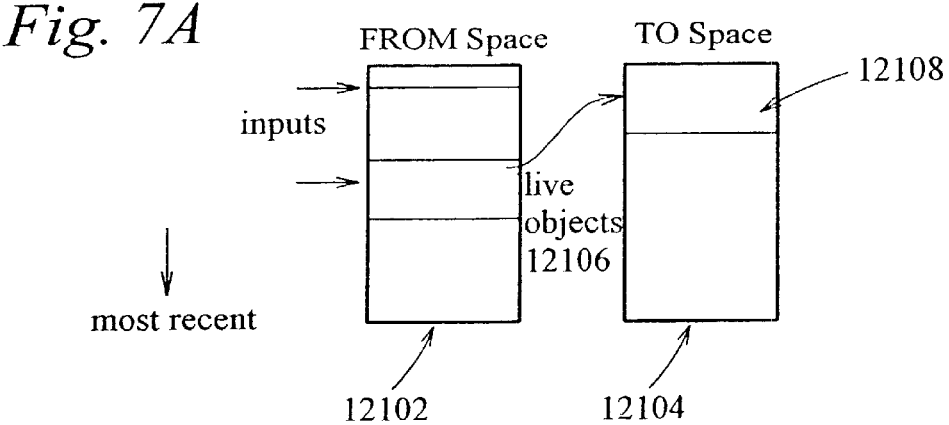
FIGS. 7A–7H show objects, stacks and packets for use in a garbage collection process.
Figure 7B:
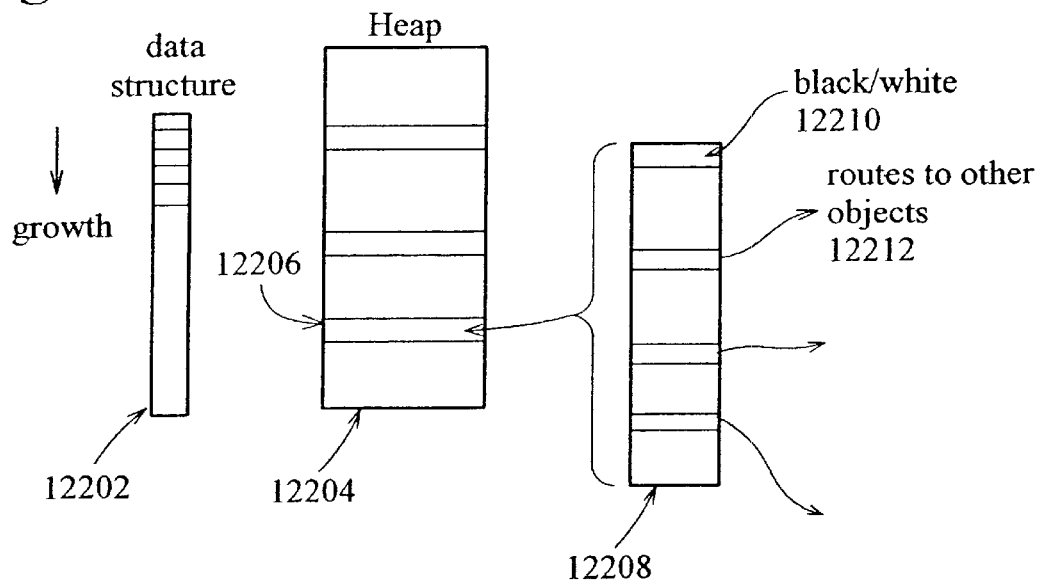
Figure 7C:
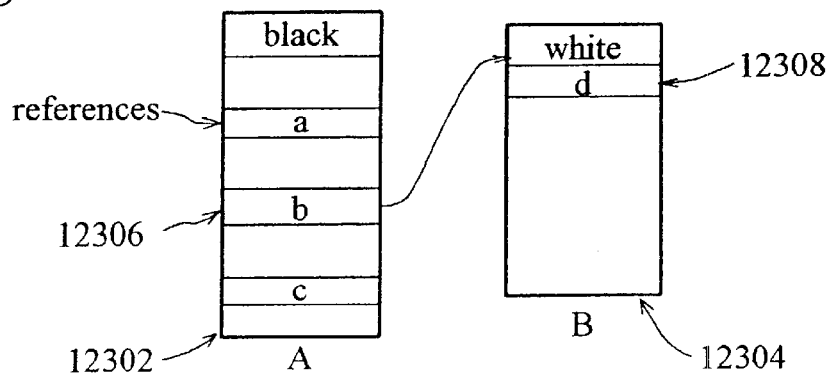
Figure 7D:
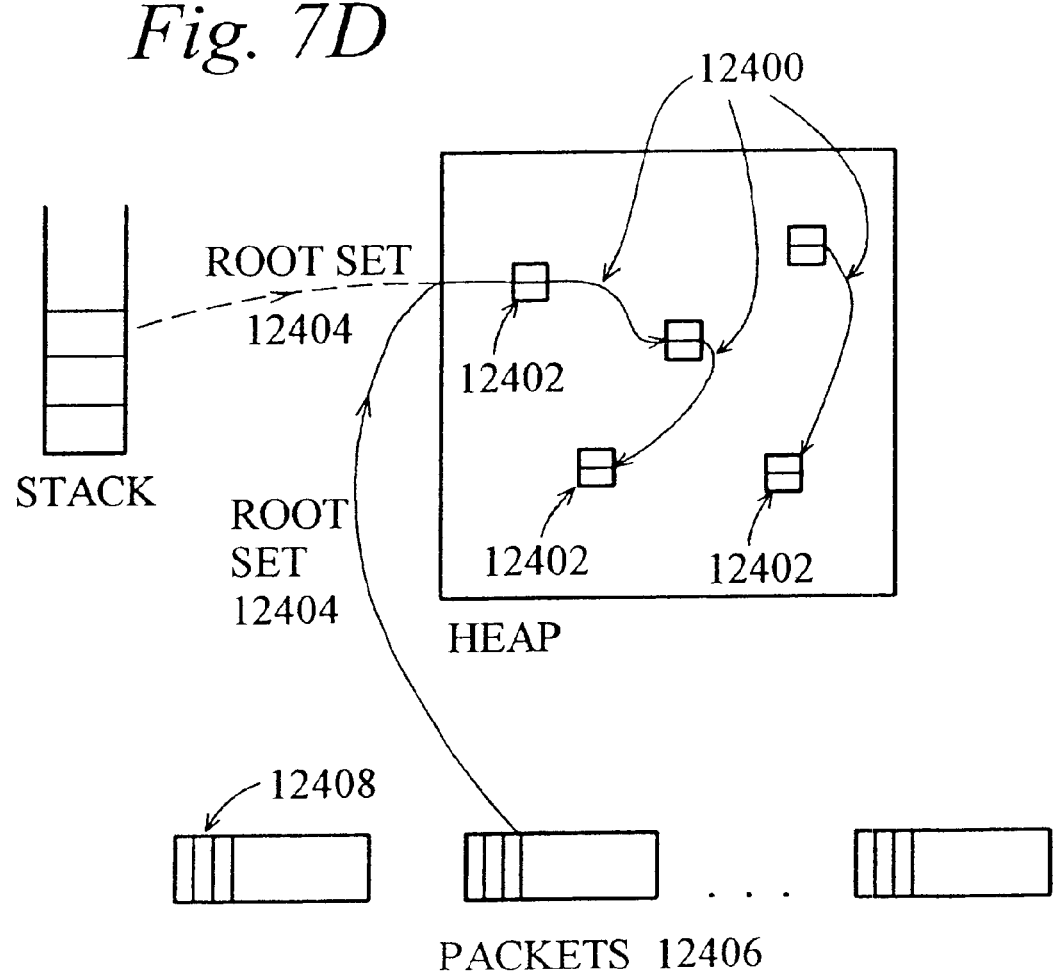
Figure 7E:
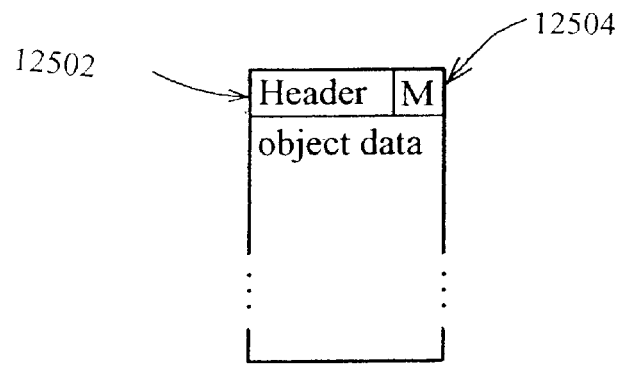
Figure 7F:
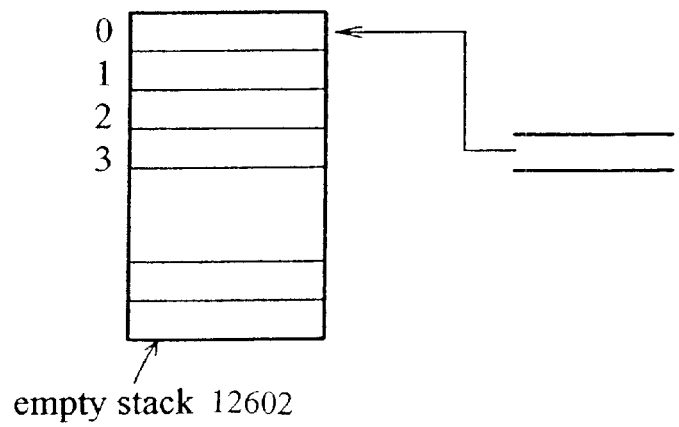
Figure 7G:
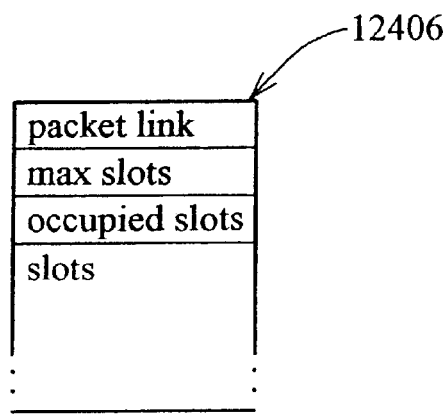
Figure 7H:
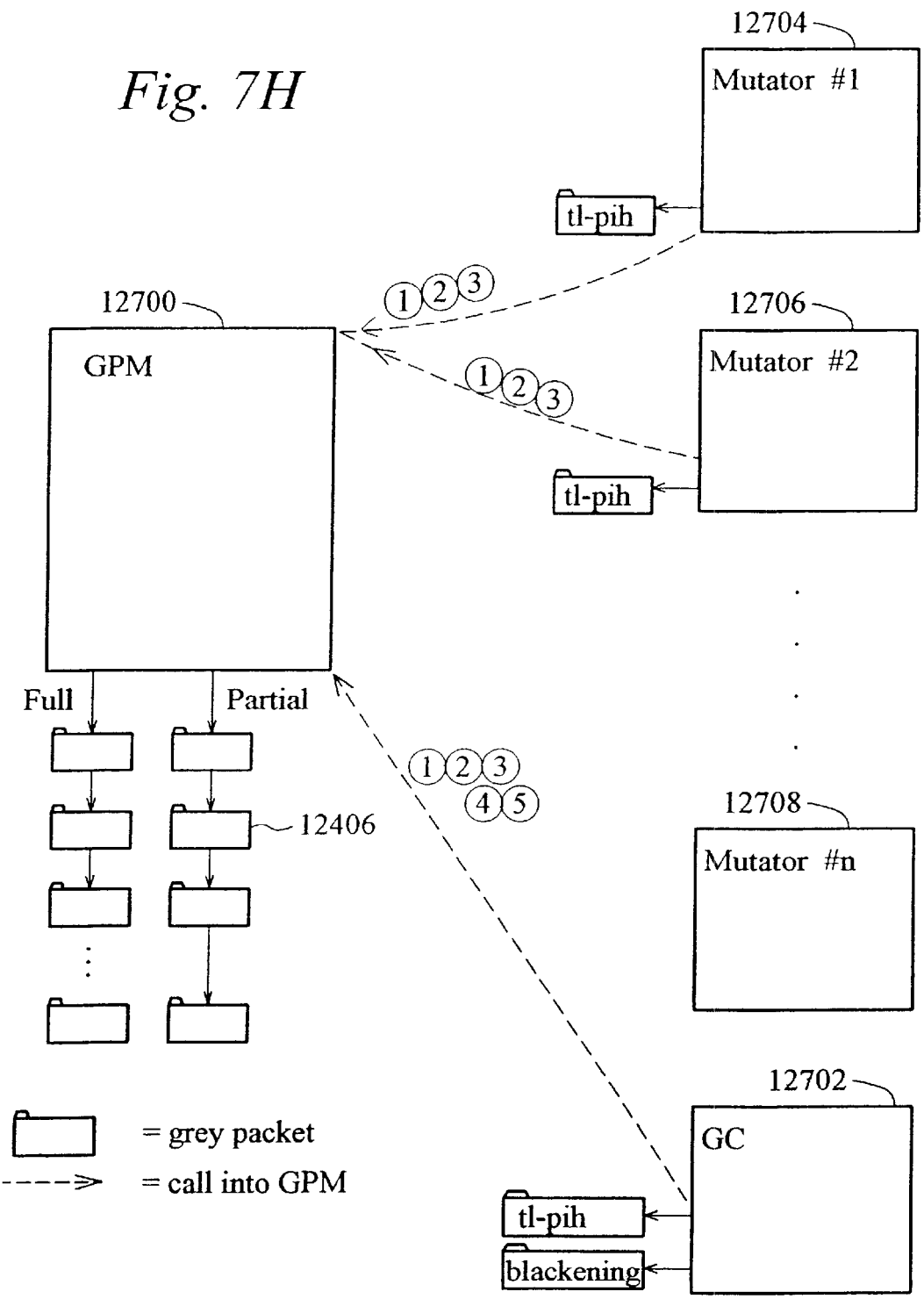
Figure 8A:
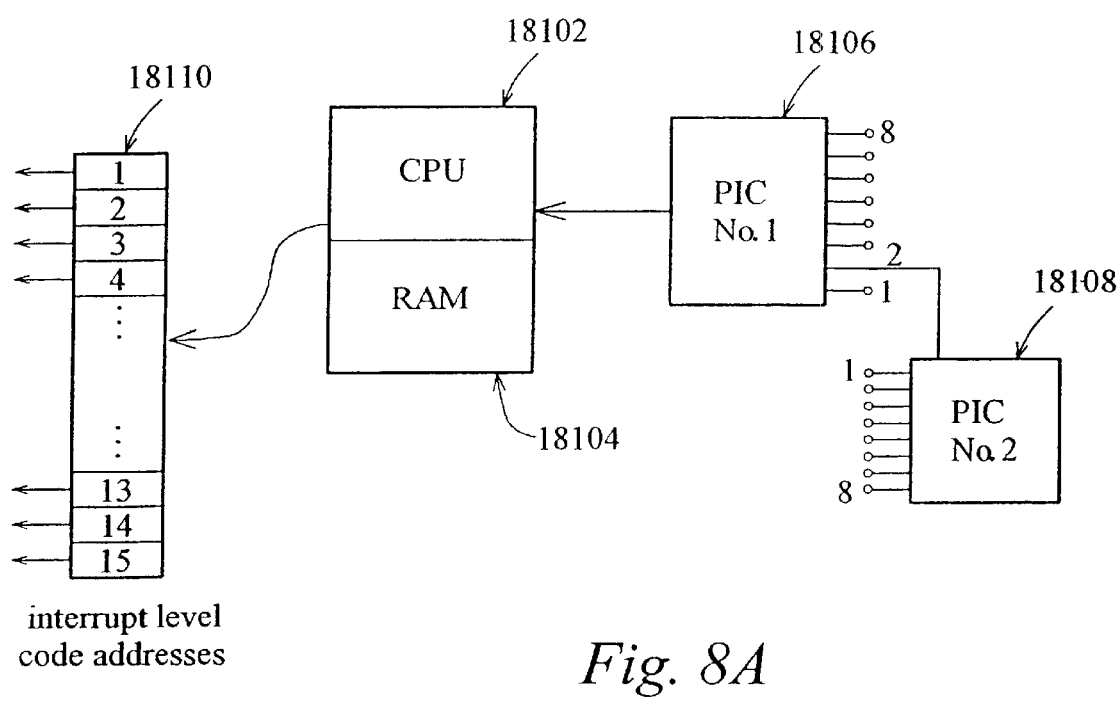
Figure 8D:
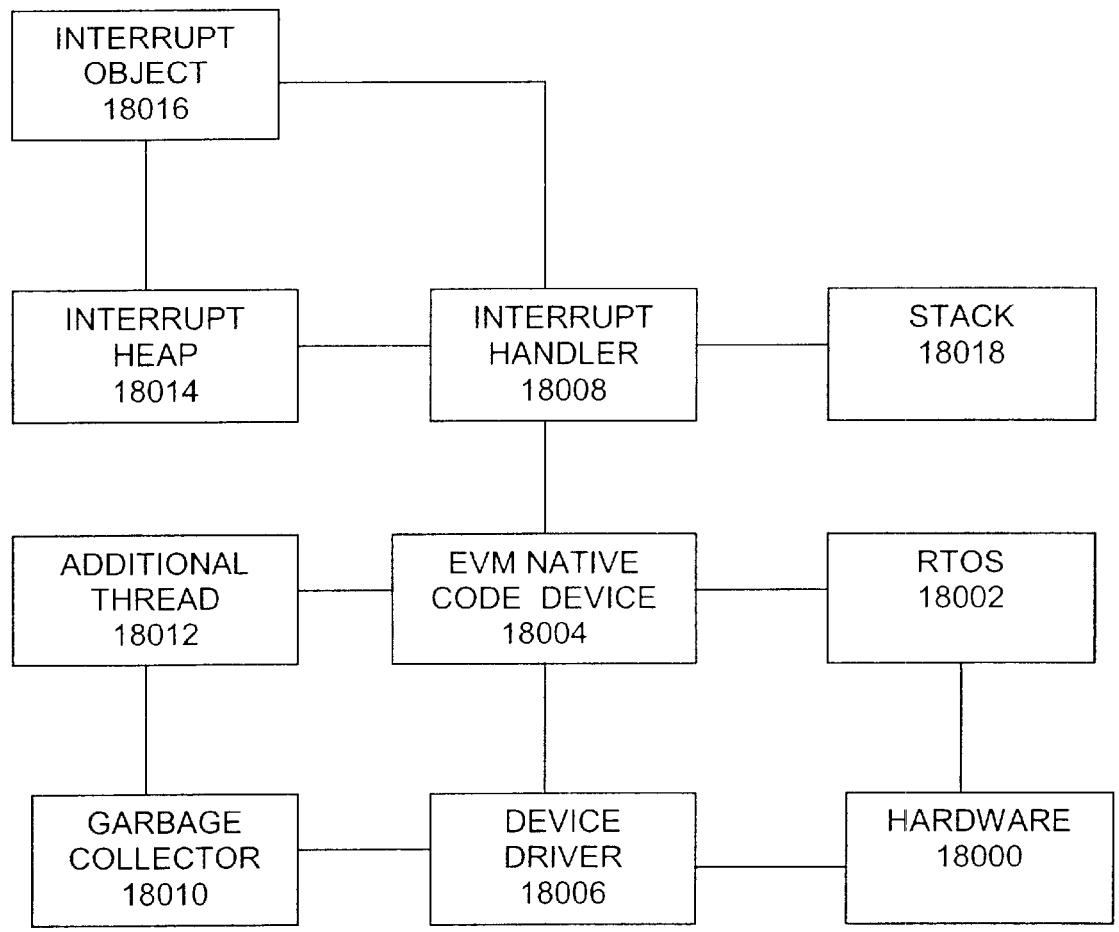
Figure 9A:
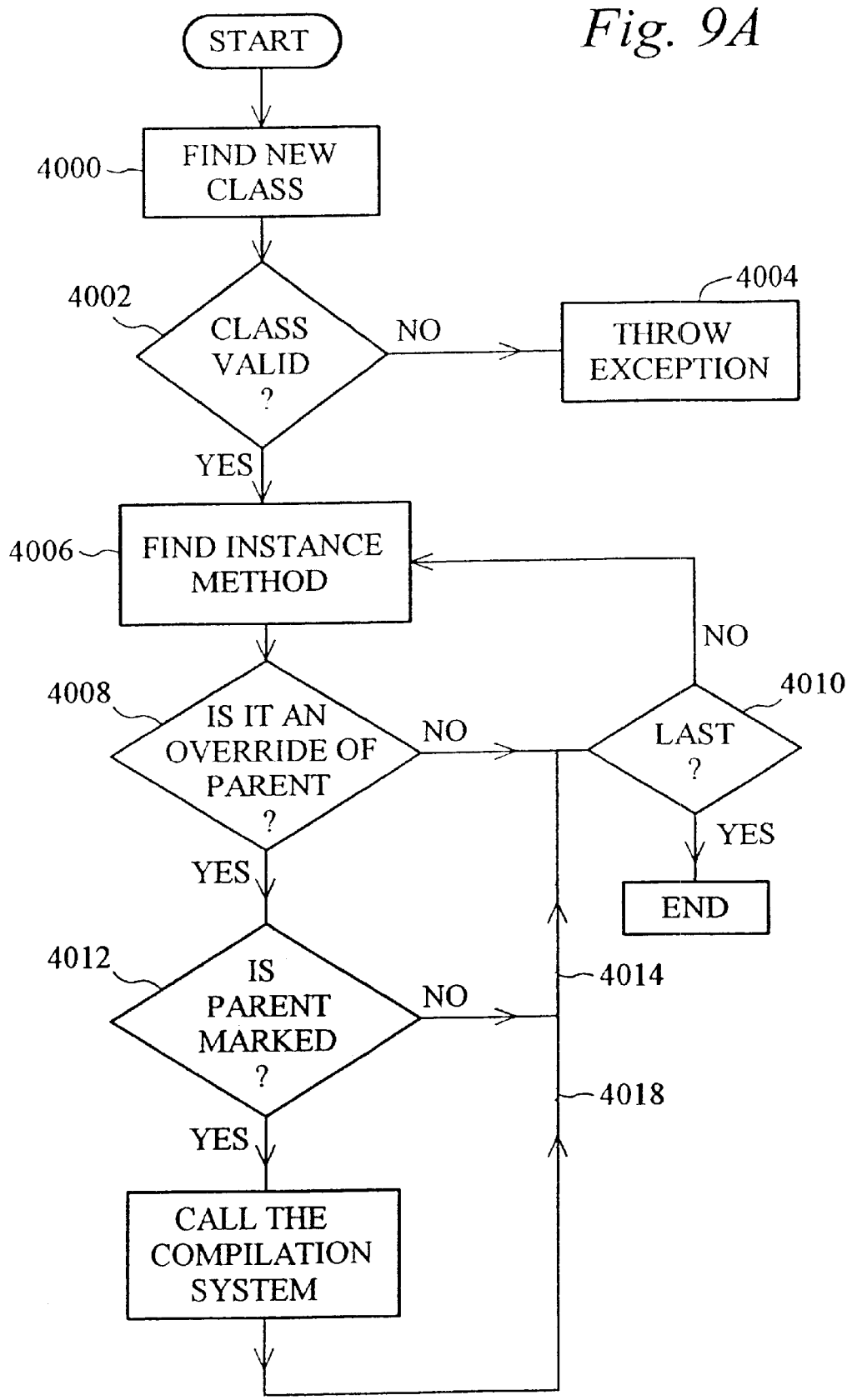
FIGS. 9A–9D show a method for determining class and instance overrides.
Figure 9B:
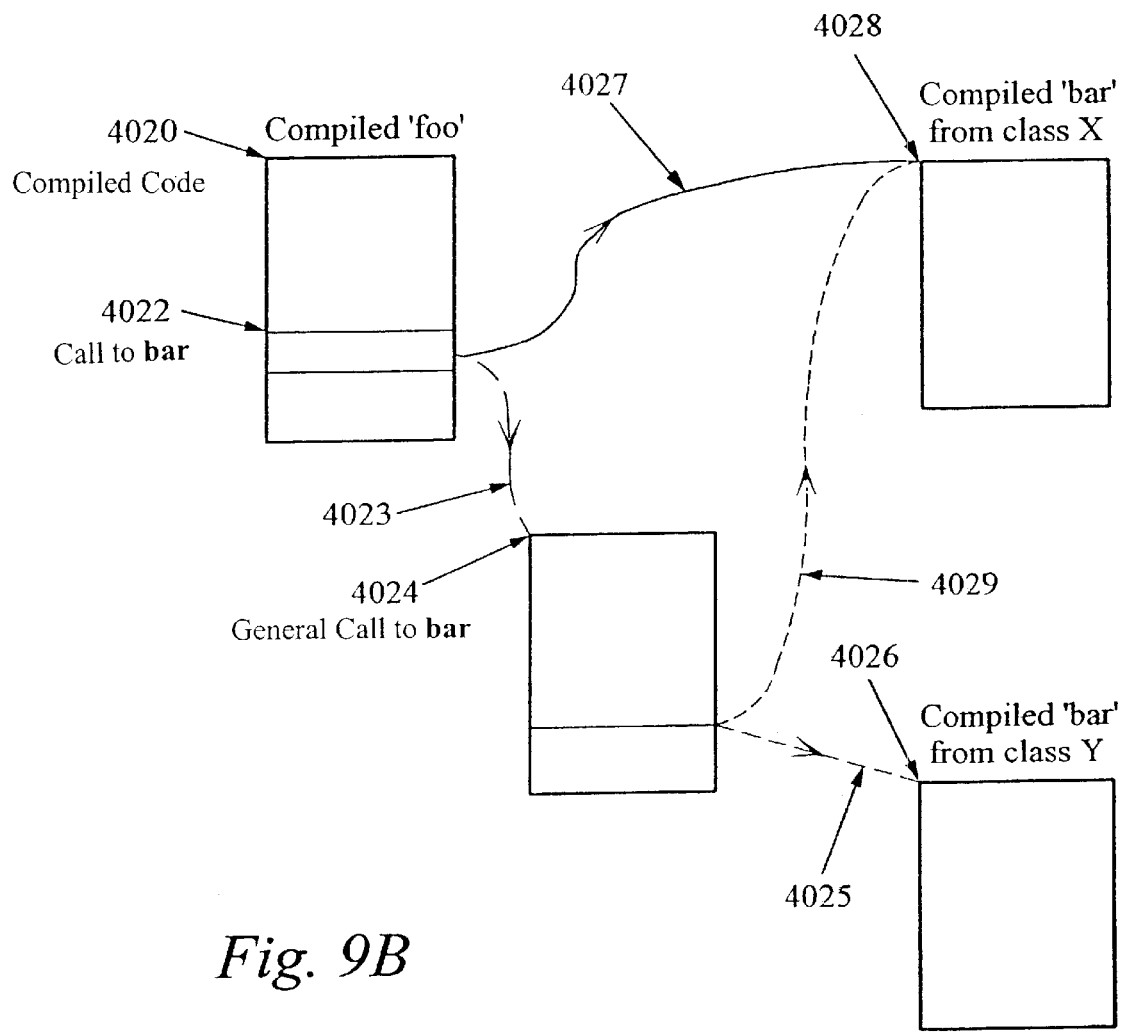
Figure 9C:
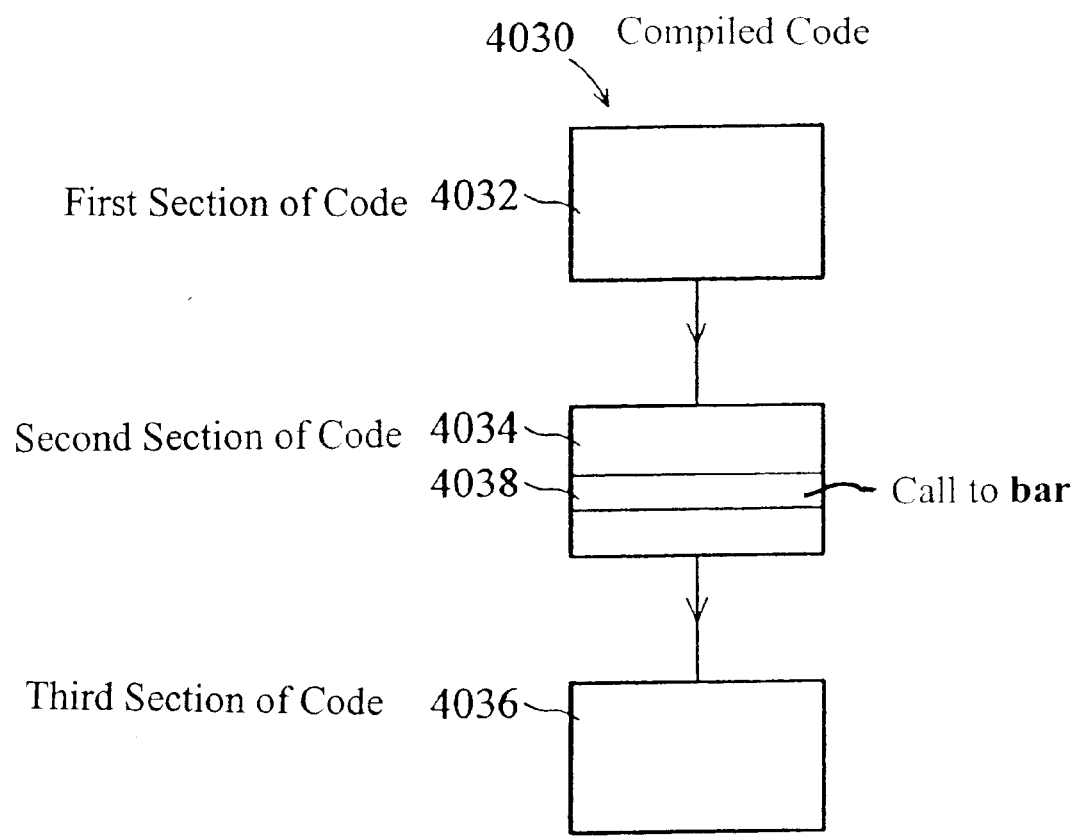
Figure 9D:
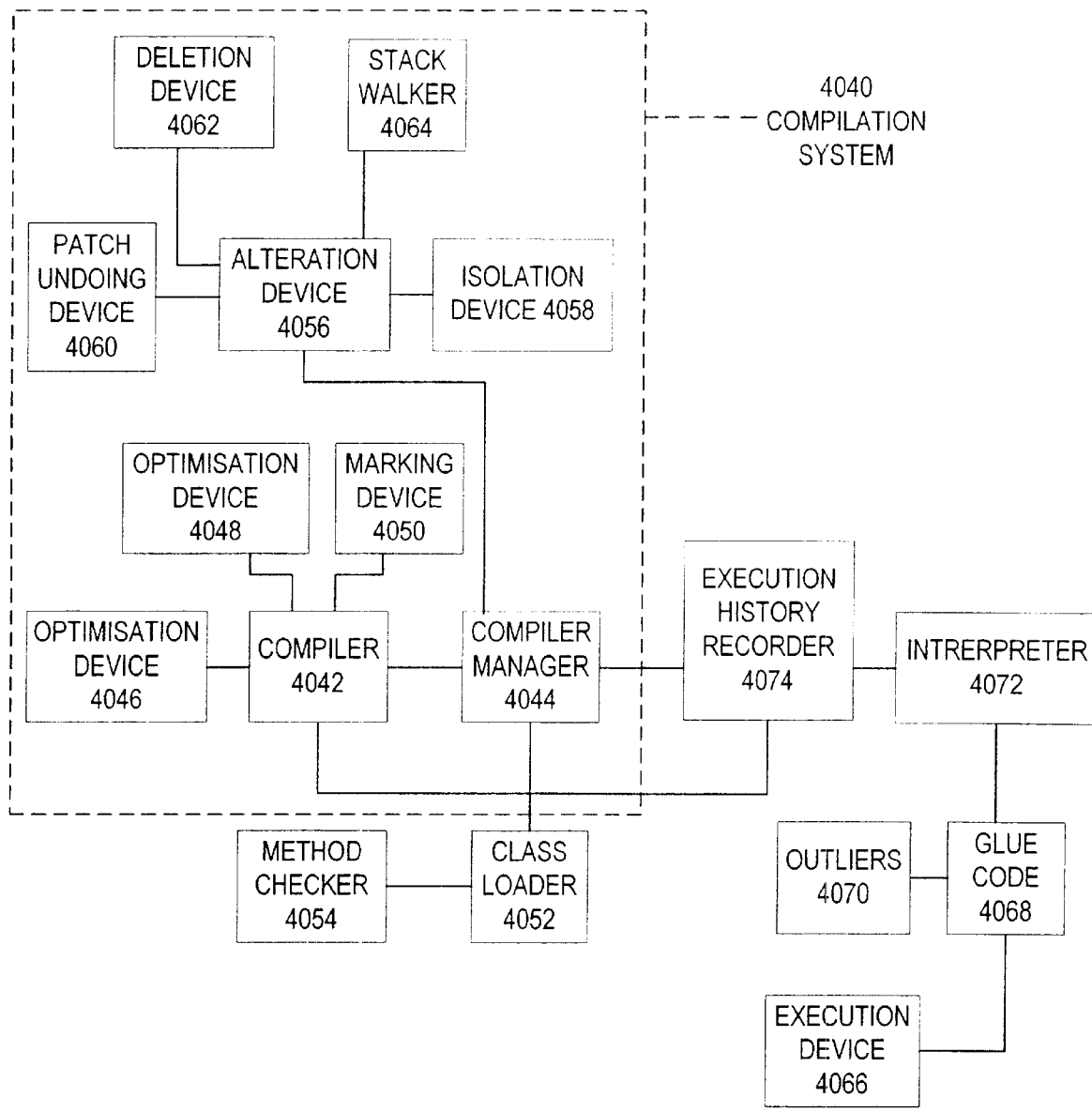
Figure 10A:
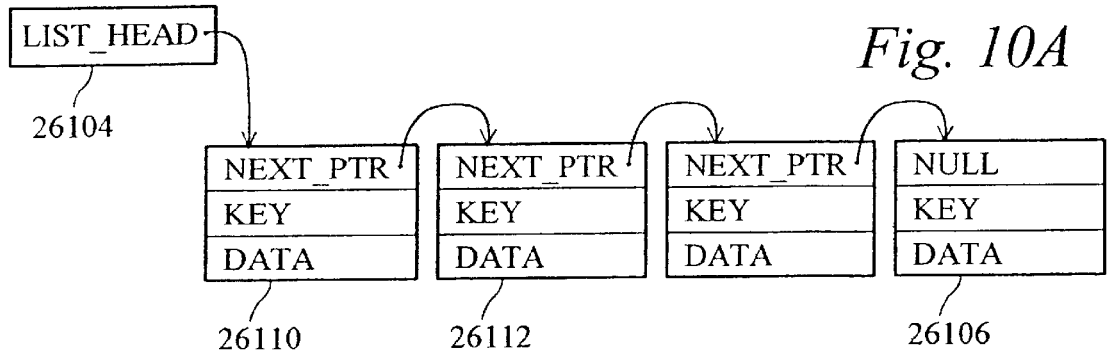
FIGS. 10A–10D show lists and pointers for creating a list of entries in a computer system.
Figure 10B:
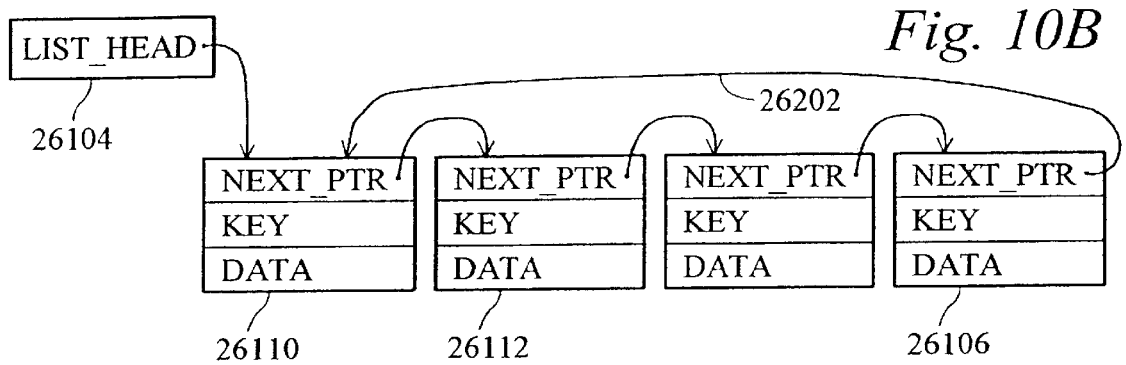
Figure 10C:
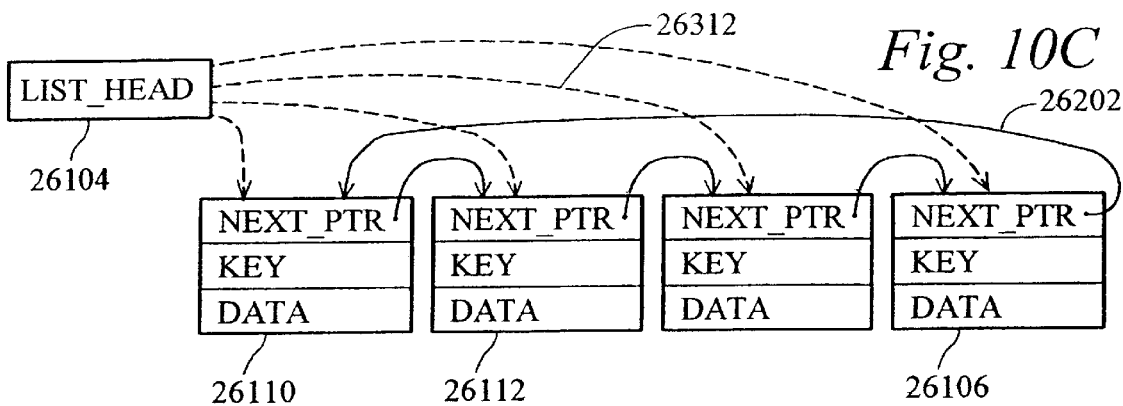
Figure 10D:
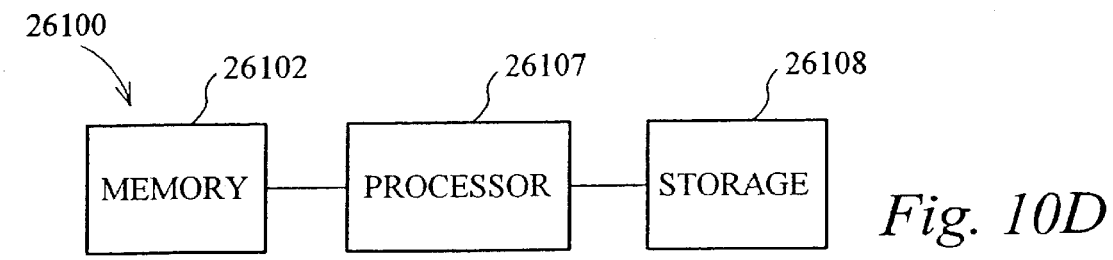
Figure 11A:
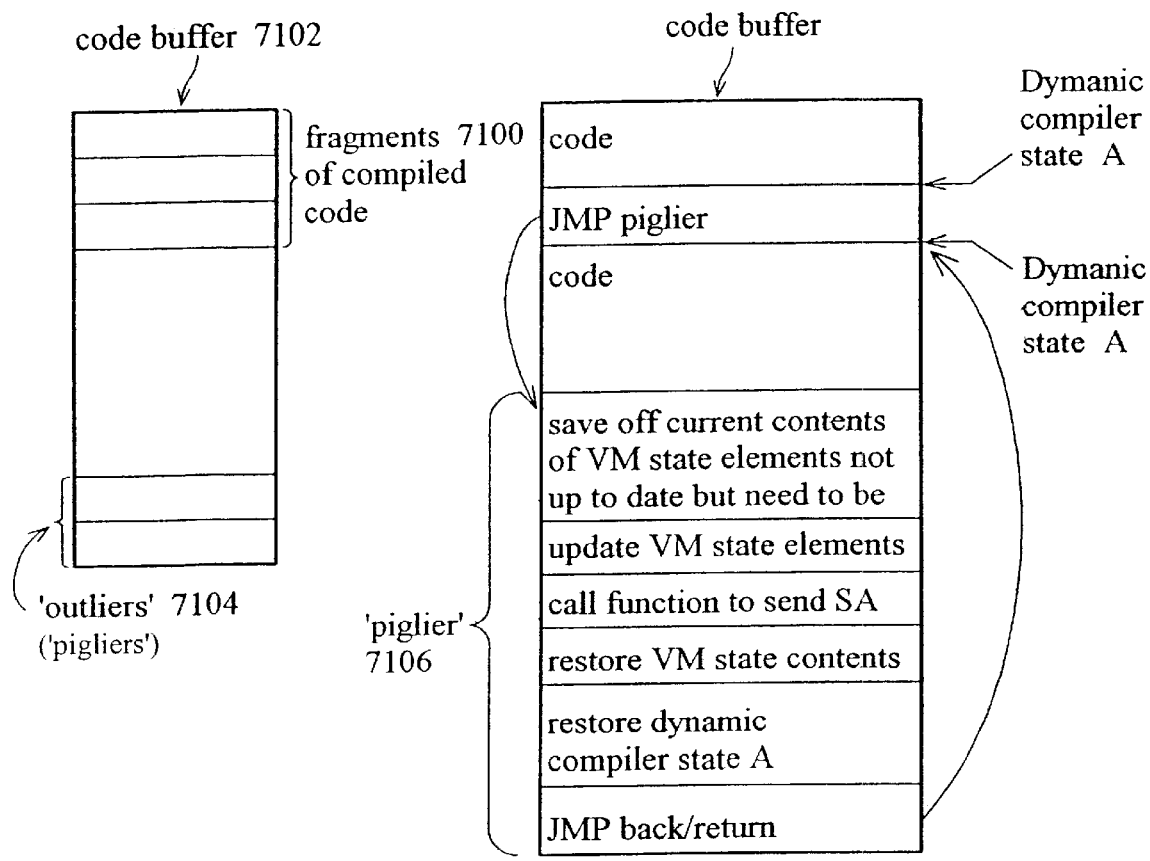
FIGS. 11A–11B show code fragments and code buffers for use in testing and verification of dynamically compiled code in a virtual machine.
Figure 11B:
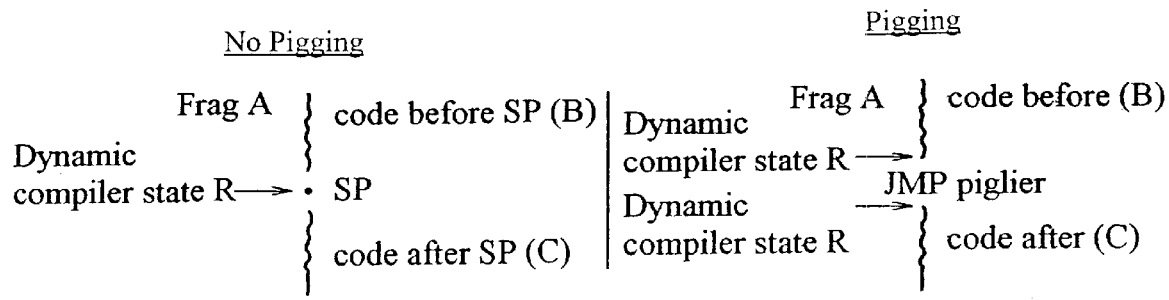
Figure 12A:
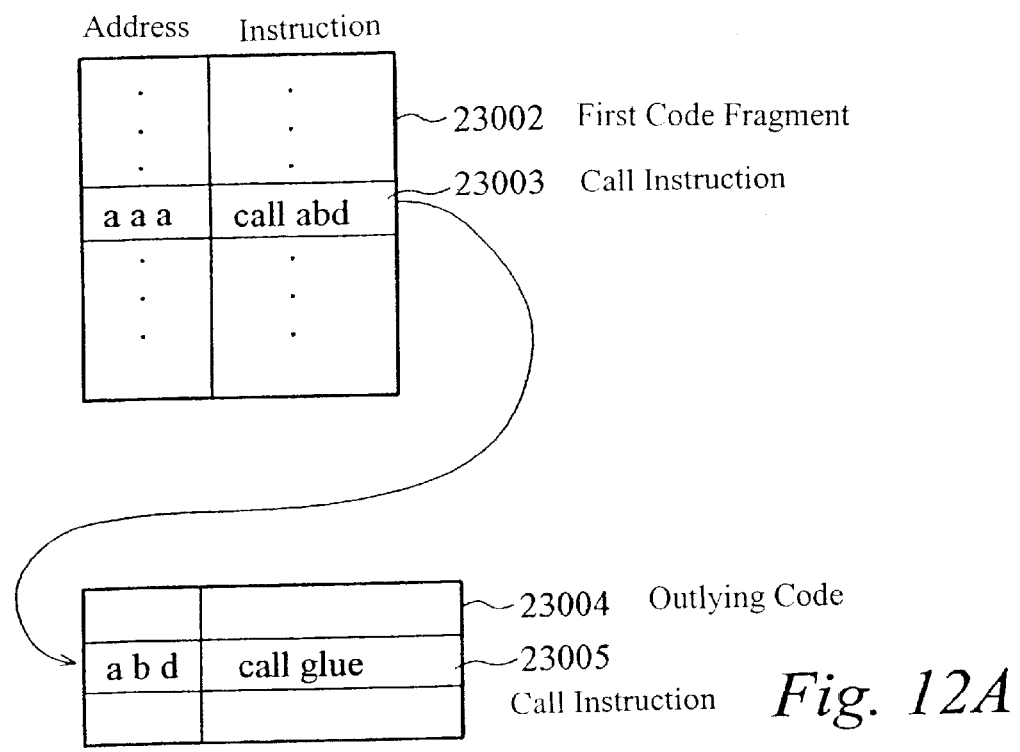
FIGS. 12A–12G show a method for using patches and an apparatus for performing the method.
Figure 12B:
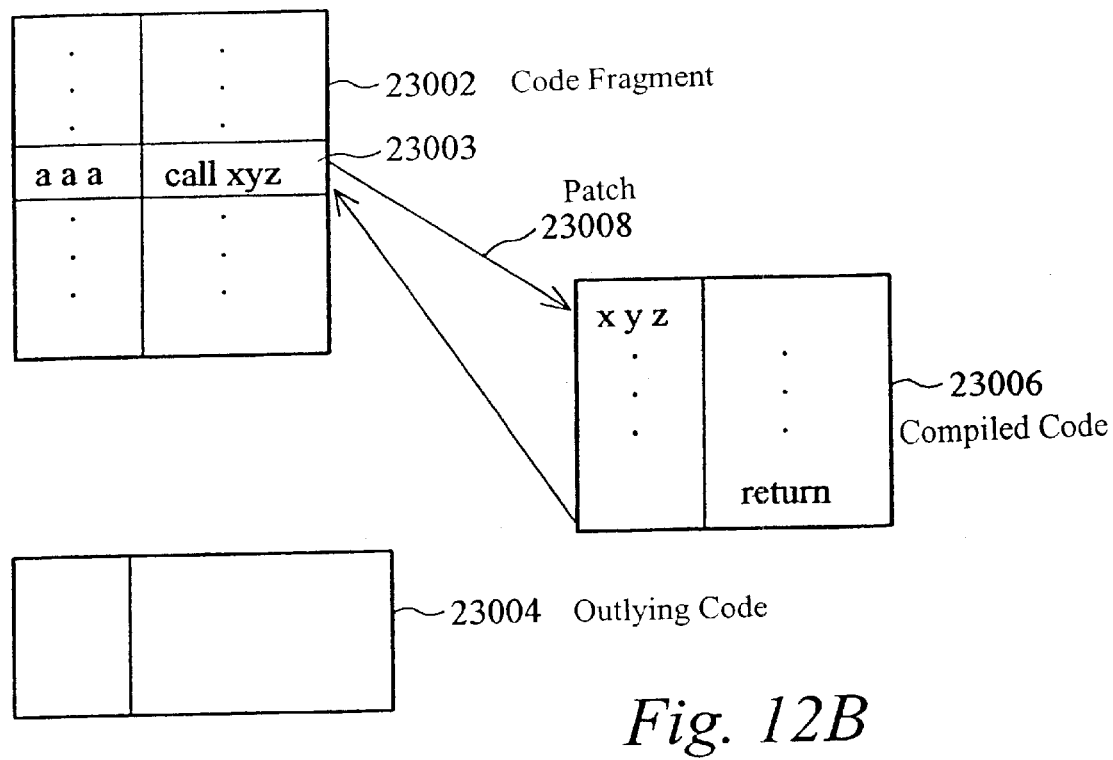
Figure 12C:
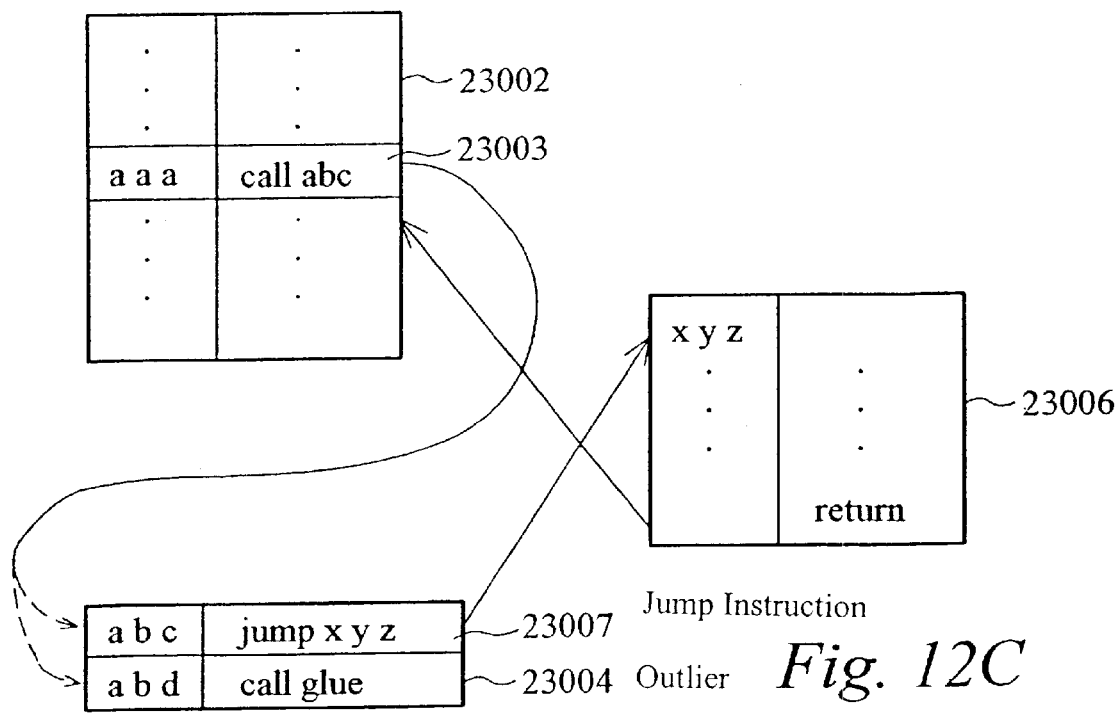
Figure 12D:
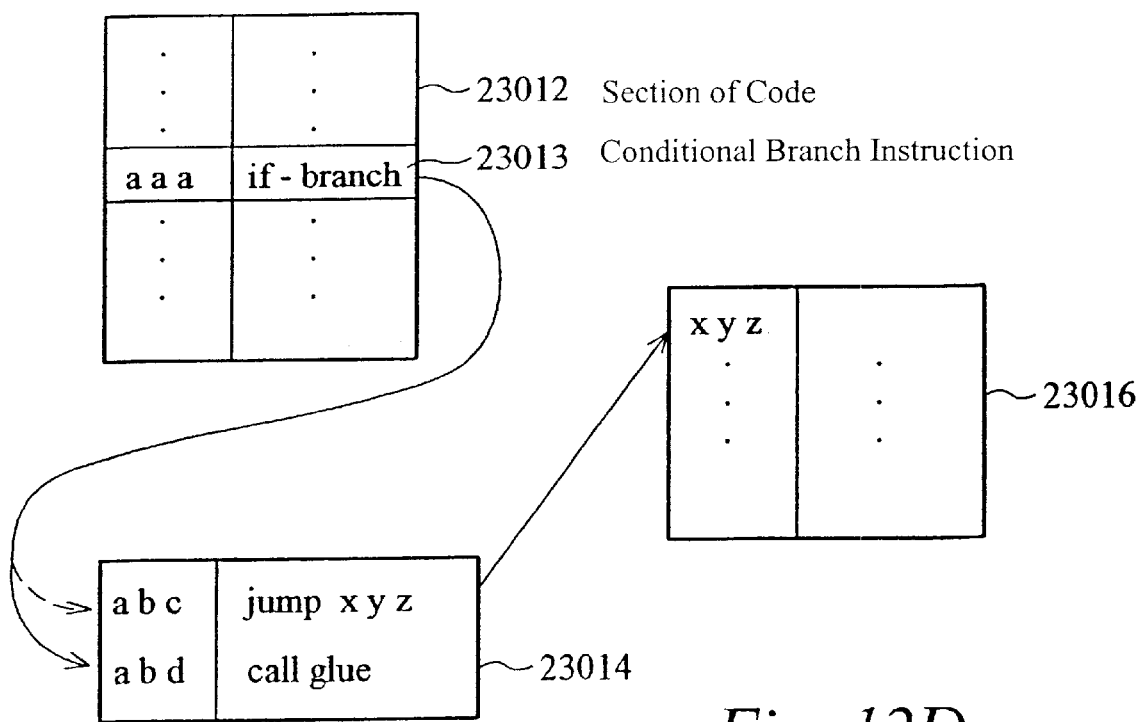
Figure 12E:
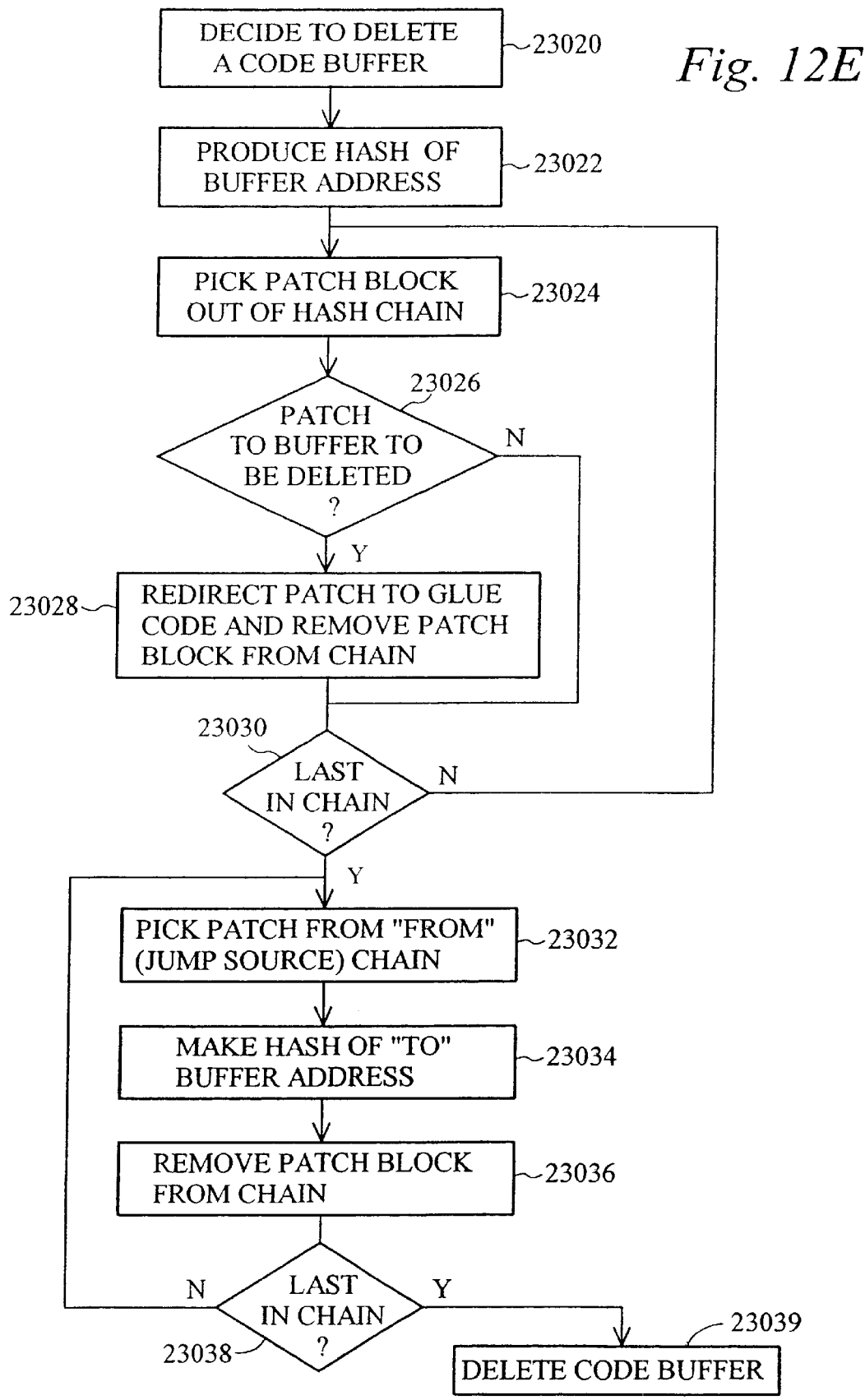
Figure 12F:
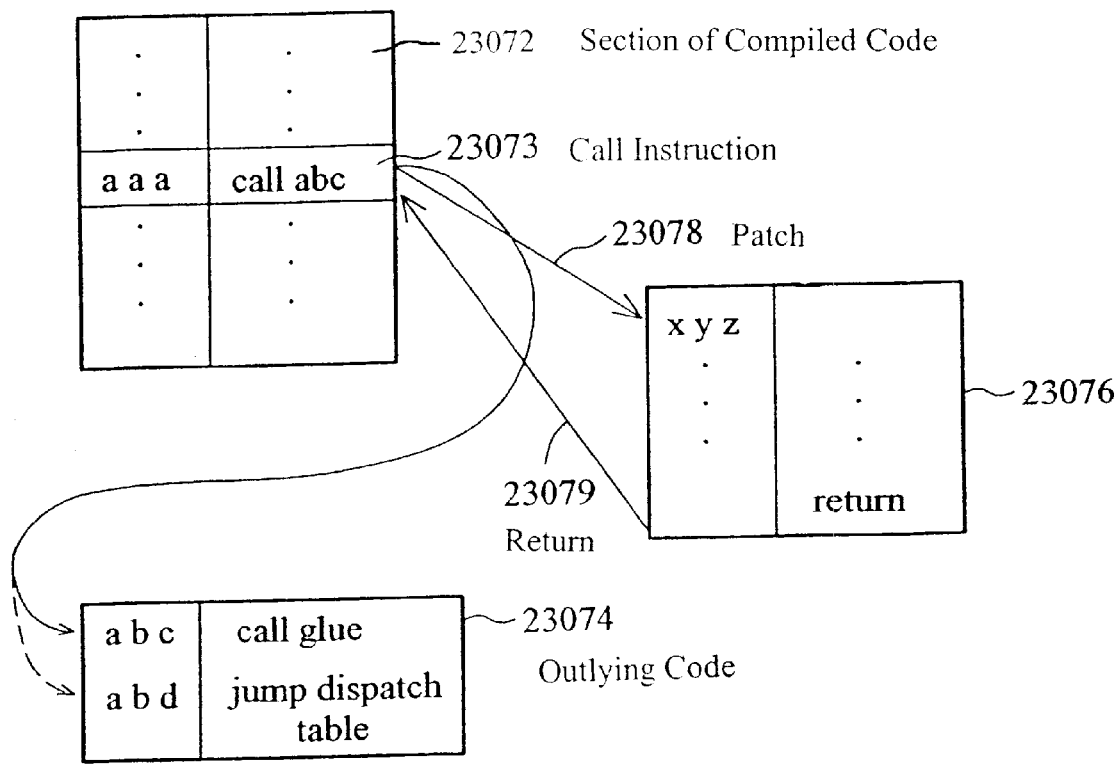
Figure 12G:
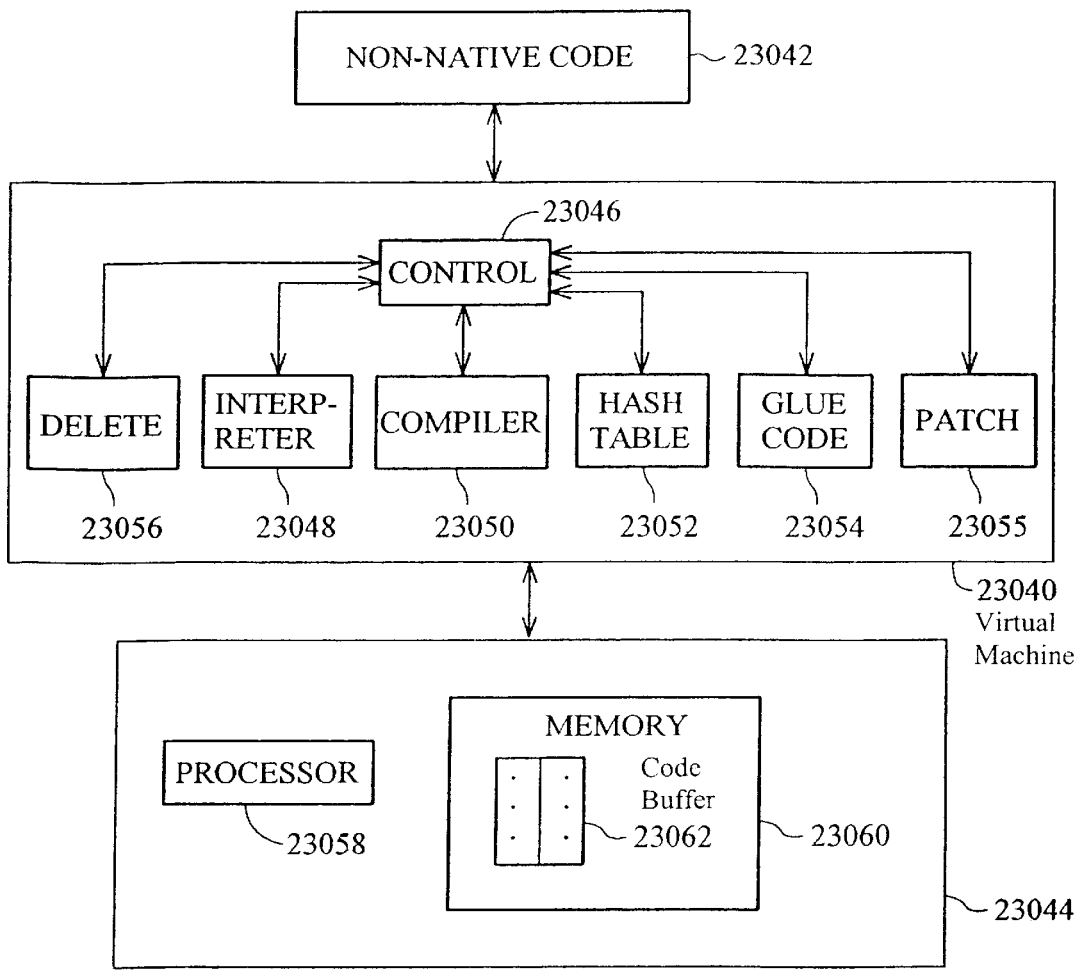

Referring now to FIG. 6E, apparatus for putting the present embodiment into effect will be described.

FIG. 6E shows a computer system including a virtual machine 5050 which allows non-native code 5052 to run on host computer 5054. The virtual machine includes control means 5056, interpreter 5058 which interprets non-native application code, compiler 5060 which compiles sections of non-native application code, and 'stack walker' 5062. The host computer includes a processor 5064 and memory 5068. In FIG. 6E a single processor is shown which executes several threads simultaneously by appropriate division of its time between the various threads, but two or more processors could be provided, each executing one or more threads.

Compiled code 5070 which has been compiled by compiler 5060 is stored in memory 5068. Also located in memory 5068 are a number of stacks 5072, 5073, 5074 corresponding to the number of threads that are being executed by the processor 5064.

In operation, the control means 5056 may decide at a certain time that a section of compiled code 5070 should be deleted, for example to allow this area of memory to be used for other purposes. The control means then indicates to stack walker 5062 that this section of code is to be deleted. The stack walker pauses operation of each thread in turn, and examines the frames in the stacks of the threads to identify any frames which contain return addresses which are in the area of memory containing the section of code to be deleted. Any such addresses are changed to the address of a piece of glue code 5076, and other fields in the frame are adjusted to 'clean up' any optimisations of local variable values, or of variables specific to the virtual machine, that may have been made. The glue code operates in the way described above with reference to FIG. 6D. Once all of the frames in all of the stacks in all of the threads have been examined and the appropriate changes to the stack contents have been made, the stack walker 5062 indicates to the control means 5056 that the section of code may be deleted. The control means 5056 then controls deletion means 5078 to delete the section of compiled code 5070.

In summary, at code deletion time, each thread in the virtual machine is paused in turn, and the stacks of these threads are scanned, looking for return address values which point at code which is to be deleted. Once one of these cases is found, the state of the stack around the return address value is adjusted to "clean up" the virtual machine state for that thread at the point where the return is encountered (i.e., some time in the future for that thread), and the return address value itself is adjusted to cause the flow of execution to transition to one of a small number of central pieces of code. These centralised pieces of code (termed "glue code") perform some generalised checks and cause the continuation of the flow of execution for that thread in the appropriate manner; usually this will involve interpretation of subsequent emulated instructions until a section of emulated instructions is encountered for which there is a compiled version.

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like are performed on or using electrical and like signals.

Features which relate to the storage of information may be implemented by suitable memory locations or stores. Features that relate to the processing of information may be implemented by a suitable processor or control means, either in software or in hardware or in a combination of the two.

In any or all of the aforementioned, the invention may be embodied in any, some, or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term 'computer system' may be interchanged for 'computer,' 'system,' 'equipment,' 'apparatus,' 'machine,' and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

What is claimed is:

1. A method of managing memory in a computer system, the computer system having at least one stack with a plurality of frames, and a thread associated with the stack, the method comprising:
    identifying compiled code to be deleted, the compiled code having a range of addresses;
    examining one of the plurality of frames of the stack, each frame having a return address;
    determining whether the return address of the one of the plurality of frames is in the range of addresses of the compiled code to be deleted; and
    altering the contents of the one of the plurality of frames if the return address of the one of the plurality of the frames is in the range of addresses of the compiled code to be deleted.

2. A method as claimed in claim 1, further comprising repeating the acts of examining, determining, and altering until all of the frames of the stack have been examined.

3. A method as claimed in claim 2, wherein the computer system includes a plurality of stacks, each stack associated with a thread and having a plurality of frames, the method further comprising repeating the acts of examining, determining, and altering until all threads have been examined.

4. A method as claimed in claim 2, further comprising deleting the compiled code.

5. A method as claimed in claim 1, further comprising inserting a write barrier in the compiled code.

6. A method as claimed in claim 1, further comprising adjusting frame fields to compensate for optimizations.

7. A method as claimed in claim 1, further comprising searching for a compiled version of non-native code that corresponds to the compiled code to be deleted.

8. A method as claimed in claim 1, further comprising interpreting a portion of non-native code that corresponds to the compiled code to be deleted.

9. A computer system comprising:
    a control device;
    a deleter coupled to the control device;
    an interpreter coupled to the control device for interpreting non-compiled code;
    a compiler coupled to the control device for providing compiled code; and
    a stack walker coupled to the control device, the stack walker having access to glue code for passing execution by the computer system between the compiled code and the non-compiled code.

10. A computer system as claimed in claim 9, wherein the control device, deleter, interpreter, compiler, and stack walker are part of a virtual machine, and further comprising.

11. A computer system as claimed in claim 9, wherein the control device is operable to select compiled code to be deleted, the compiled code having a range of addresses.

12. A computer system as claimed in claim 11, wherein the system executes multiple threads, each thread having an associated stack with a plurality of frames, and wherein the stack walker is operable to pause threads and examine the frames in each stack to identify whether a return address of any frame falls with the range of addresses of the compiled code.

13. A computer system as claimed in claim 12, wherein the host processor is associated with a memory, and the associated stacks are located in the memory.

14. A computer system as claimed in claim 12, wherein the return address of any frame that falls within the range of addresses of the compiled code is modified to refer to the glue code.

15. A computer system as claimed in claim 14, wherein the glue code is arranged to check for the existence of a piece of compiled code.

16. A computer system as claimed in claim 14, wherein the glue code is arranged to transfer control to the interpreter.

17. A method of managing memory in a computer system, the computer system having a stack with a plurality of frames, each frame having a return address, the method comprising:
    accessing the stack with a first thread one frame at a time;
    accessing the stack with a second thread one frame at a time;
    pausing the first thread only for the time it takes the second thread to access the current frame of the first thread;
    identifying compiled code to be deleted, the compiled code having a range of addresses;
    examining one of the plurality of frames of the stack;
    determining whether the return address of the one of the plurality of frames is in the range of addresses of the compiled code; and
    altering the contents of the one of the plurality of frames if the return address of the one of the plurality of the frames is in the range of addresses of the compiled code.

* * * * *